US012644560B2

(12) United States Patent
Johnson, Sr. et al.

(10) Patent No.:    US 12,644,560 B2
(45) Date of Patent:    Jun. 2, 2026

(54) SUPPORT FOR A CLAMP WITH IMPROVED STRUCTURE

(71) Applicant: Really Right Stuff, LLC, Lehi, UT (US)

(72) Inventors: Joseph M. Johnson, Sr., Lehi, UT (US); Verent Chan, Lehi, UT (US); Ricky Wai, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 58 days.

(21) Appl. No.: 18/658,283

(22) Filed: May 8, 2024

(65) Prior Publication Data

US 2024/0410515 A1    Dec. 12, 2024

Related U.S. Application Data

(60) Provisional application No. 63/507,385, filed on Jun. 9, 2023.

(51) Int. Cl.
*F16M 11/04*    (2006.01)
*F16M 11/12*    (2006.01)

(52) U.S. Cl.
CPC ......... *F16M 11/041* (2013.01); *F16M 11/126* (2013.01)

(58) Field of Classification Search
CPC .... F16M 11/041; F16M 11/126; F16M 11/10; F16M 13/00; F16M 2200/022; F16M 13/022

USPC ............ 248/229.16, 357, 177.1, 371, 178.1, 248/179.1, 184.1, 183.4, 317, 3, 23, 324
See application file for complete search history.

(56) References Cited

U.S. PATENT DOCUMENTS

| | | | | | |
|---|---|---|---|---|---|
| 2,563,389 | A | * | 8/1951 | Blum | F16M 11/10 248/180.1 |
| 2,599,269 | A | * | 6/1952 | Markle | F16M 11/2064 248/404 |
| 3,128,982 | A | * | 4/1964 | Christopher | F16M 11/28 396/428 |
| 3,517,904 | A | * | 6/1970 | Verchain | F16M 11/2085 248/324 |
| 3,737,130 | A | * | 6/1973 | Shiraishi | F16M 11/048 248/181.1 |
| 4,010,923 | A | * | 3/1977 | Miller | F16M 11/2014 248/183.2 |
| 4,519,635 | A | * | 5/1985 | McMath | F16L 37/18 285/91 |
| 4,525,052 | A | * | 6/1985 | Kosugi | F16M 11/041 396/419 |
| 4,697,772 | A | * | 10/1987 | Kosugi | F16M 11/2064 264/293 |
| 4,736,217 | A | * | 4/1988 | McDowell | F16M 13/00 396/428 |
| 4,763,151 | A | * | 8/1988 | Klinger | F16M 11/2014 396/419 |
| 4,886,230 | A | * | 12/1989 | Jones | F16M 11/38 403/90 |
| 4,929,973 | A | * | 5/1990 | Nakatani | F16M 11/041 396/419 |
| 5,078,355 | A | * | 1/1992 | Fujimoto | F16M 11/10 248/278.1 |

(Continued)

*Primary Examiner* — Muhammad Ijaz

(74) *Attorney, Agent, or Firm* — Chernoff, Vilhauer, McClung & Stenzel LLP

(57)    ABSTRACT

An apparatus for supporting a clamp.

16 Claims, 33 Drawing Sheets

(56) References Cited

U.S. PATENT DOCUMENTS

| | | | | |
|---|---|---|---|---|
| 5,528,325 | A * | 6/1996 | Perez | G03B 15/03 396/428 |
| 6,196,504 | B1 * | 3/2001 | Lemke | F16M 11/041 396/428 |
| 6,435,738 | B1 * | 8/2002 | Vogt | F16M 13/00 396/419 |
| 6,618,976 | B1 * | 9/2003 | Swan | F41C 23/16 42/114 |
| 6,729,778 | B1 * | 5/2004 | Wu | F16M 11/14 396/428 |
| 6,773,172 | B1 * | 8/2004 | Johnson | F16M 13/00 396/428 |
| 6,827,319 | B2 * | 12/2004 | Mayr | F16M 13/00 396/428 |
| 7,077,582 | B2 * | 7/2006 | Johnson | F16M 11/16 396/428 |
| 7,431,247 | B2 * | 10/2008 | Bobro | F41A 23/10 248/176.1 |
| 7,588,376 | B2 * | 9/2009 | Friedrich | F16M 11/08 396/419 |
| 7,658,556 | B2 * | 2/2010 | Johnson | F16M 11/041 396/428 |
| 7,823,316 | B2 * | 11/2010 | Storch | F41G 11/003 42/127 |
| 7,828,256 | B2 * | 11/2010 | Speggiorin | F16M 11/041 396/419 |
| 7,959,120 | B2 * | 6/2011 | Liao | B60R 11/0252 248/292.12 |
| 8,256,726 | B2 * | 9/2012 | Bordignon | F16M 1/04 396/419 |
| 8,418,973 | B2 * | 4/2013 | Liu | F16M 11/2035 248/176.1 |
| 8,578,647 | B2 * | 11/2013 | Storch | F41G 11/003 248/187.1 |
| 8,757,564 | B2 * | 6/2014 | Huang | F16M 11/18 396/419 |
| 8,979,058 | B2 * | 3/2015 | Li | G03B 17/561 396/428 |
| 9,303,940 | B2 * | 4/2016 | Bonelli | F16M 11/38 |
| 10,317,174 | B2 * | 6/2019 | Samson | F41G 11/004 |
| 10,612,718 | B2 * | 4/2020 | Johnson, Sr. | F16M 11/041 |
| 11,408,553 | B2 * | 8/2022 | Li | G03B 17/561 |
| 11,703,744 | B2 * | 7/2023 | Chan | G03B 17/561 248/316.2 |
| 11,841,108 | B2 * | 12/2023 | Steere | F16M 11/34 |
| 12,359,685 | B2 * | 7/2025 | Stabler | B25B 1/02 |
| 2002/0179786 | A1 * | 12/2002 | Zheng | F16M 11/2078 248/179.1 |
| 2003/0122045 | A1 * | 7/2003 | Mulford | F16M 13/02 248/231.71 |
| 2003/0218108 | A1 * | 11/2003 | Werner | F16M 11/041 396/419 |
| 2005/0267600 | A1 * | 12/2005 | Haberman | F16M 11/2092 403/381 |
| 2006/0175482 | A1 * | 8/2006 | Johnson | F16M 11/14 248/176.1 |
| 2006/0177215 | A1 * | 8/2006 | Johnson | G03B 17/56 396/419 |
| 2006/0239677 | A1 * | 10/2006 | Friedrich | F16M 11/08 396/419 |
| 2007/0012833 | A1 * | 1/2007 | Depay | F16M 13/00 248/226.11 |
| 2007/0152116 | A1 * | 7/2007 | Madsen | F16M 11/14 248/181.1 |
| 2008/0006747 | A1 * | 1/2008 | Bobro | F41A 23/10 248/178.1 |
| 2010/0148023 | A1 * | 6/2010 | Speggiorin | F16M 11/041 248/187.1 |
| 2010/0295227 | A1 * | 11/2010 | Hung | B25B 1/103 269/244 |
| 2010/0301184 | A1 * | 12/2010 | Stabler | F41A 23/16 396/419 |
| 2011/0006170 | A1 * | 1/2011 | Liu | F16M 11/041 248/371 |
| 2012/0301131 | A1 * | 11/2012 | Johnson | F16M 11/08 396/428 |
| 2013/0193294 | A1 * | 8/2013 | Li | F16M 11/14 248/371 |
| 2013/0236235 | A1 * | 9/2013 | Johnson, Sr. | F16C 11/04 403/53 |
| 2015/0316355 | A1 * | 11/2015 | Boswell | F41G 11/004 42/146 |
| 2016/0202022 | A1 * | 7/2016 | Gao | F41G 11/004 42/90 |
| 2017/0108760 | A1 * | 4/2017 | Achenbach | F16M 11/10 |
| 2018/0224724 | A1 * | 8/2018 | Zhu | F16M 11/425 |
| 2018/0259298 | A1 * | 9/2018 | Gao | F16B 2/18 |
| 2019/0162362 | A1 * | 5/2019 | Chen | F16B 2/185 |
| 2019/0368653 | A1 * | 12/2019 | Olinger | F16M 11/041 |
| 2020/0363008 | A1 * | 11/2020 | Jankura | F16M 11/04 |
| 2021/0109425 | A1 * | 4/2021 | Jankura | F16M 11/14 |
| 2022/0113610 | A1 * | 4/2022 | Chan | G03B 17/561 |
| 2022/0260112 | A1 * | 8/2022 | Chan | F16C 11/0604 |
| 2023/0028734 | A1 * | 1/2023 | Liao | F16M 11/10 |
| 2023/0048054 | A1 * | 2/2023 | Zhou | F16M 11/10 |
| 2023/0064118 | A1 * | 3/2023 | Stabler | B25B 5/02 |
| 2024/0218961 | A1 * | 7/2024 | Zou | F16M 11/041 |
| 2024/0410515 | A1 * | 12/2024 | Johnson, Sr. | F16M 13/00 |

* cited by examiner

2020

2030

2400

2412

2410

2412

2412

2414

2416

2000

3200

2010

3410

3400

3830

3840

3834

3420

3832

3830

3842

SUPPORT FOR A CLAMP WITH IMPROVED STRUCTURE

CROSS REFERENCE TO RELATED APPLICATIONS

This application claims the benefit of U.S. Provisional application No. 63/507,385, entitled SUPPORT FOR A CLAMP WITH IMPROVED STRUCTURE, filed Jun. 9, 2023.

BACKGROUND

The subject matter of this application relates to a support for a clamp.

Photographic equipment may be mounted to a camera stand in a variety of ways. Some camera bodies, for example, have threaded sockets in their base so they can be directly mounted to a bolt that extends upwardly from the support. The camera body is positioned over the support so that the bolt fits within the socket and the camera body is spun around several times to screw the camera body to the support. Alternatively, and particularly when a heavy, elongate camera lens is attached to a camera body, the camera lens will include a support having a threaded socket positioned below the lens so that the lens may be mounted to the support in the same manner as a camera body.

These methods take an appreciable amount of time and require care to ensure that the threads of the stud are properly aligned with the threads in the socket. Further, there is often insufficient time to screw the camera body or lens to the tripod before a particular shot should be taken. This lack of time requires that the camera either be held in-hand, potentially resulting in image blur from the shake of the hand, or that the shot be missed altogether.

These difficulties can be reduced by using a quick-release clamp to mount photographic equipment to a support. Such quick-release clamps are typically designed to screw onto the bolt of the support while the photographic equipment is releasably secured to the upper surface of the clamp so that it can quickly be secured to, or released from, the support. To secure photographic equipment to such a quick-release clamp, the photographic equipment such as a camera body will typically include two parallel, opposed rails extending from its base. The opposed rails may be provided by the equipment or in the form of a plate secured to the equipment. The rails are spaced apart so that they fit within an upwardly facing channel defined by the clamp. The clamp includes a lever that moves between two positions to adjust the spacing between the side walls of the channel so that, when in a first, locking position, the channel grips the rails connected to the camera system and when in a second, released position, the channel disengages the rails so that the photographic equipment may be lifted from the clamp. In this manner, the lever may be used to quickly secure or release the photographic equipment from the support.

It is often desirable to mount such quick release clamps to a head to support a device thereon. One type of a head is a ball head includes a central ball and permits nearly endless movement of the device supported thereon. However, for many applications, such as adjusting the aim of a firearm supported thereon, the freedom of movement results in difficultly in adjusting the aim of the firearm. Another type of head is a pan and tilt head that separates horizontal, vertical and/or panning motions into separate axes (hence, "3-way"), giving you control that's more sophisticated, subtle, and user-friendly. For example, when taking pictures of architecture and landscapes it is easier to precisely line up your horizons and angles. However, such pan tile heads tend to limit the ability of the user to control its movement effectively.

It is therefore desired to provide a head with controlled movement.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
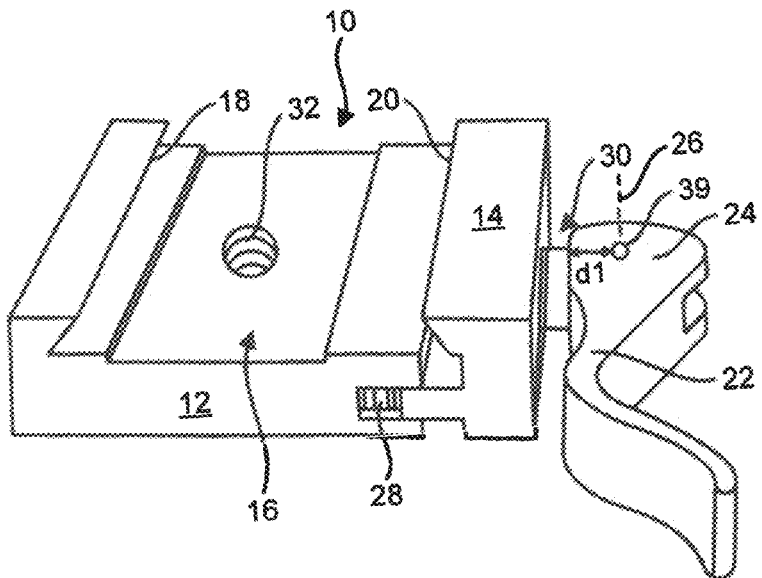
FIG. 1 illustrates a clamp that includes a lever.

FIG. 1 shows a clamp 10 that comprises a body 12 and an adjustable arm 14 that together form a channel 16 having opposed side walls 18 and 20. The body 12 may define an opening 32 through which the clamp 10 may be secured to the upper portion of a tripod or other support. The adjustable arm 14 is slidably engaged along the cantilevered portion 59 of a stud 36 (shown in FIG. 6) securely mounted in the body 12. Movement of the adjustable arm 14 selectively adjusts the width of the channel 16 and is accomplished through manual operation of a lever 22 fastened to the distal end 60 of the stud 36. The lever 22, attached to the adjustable arm 14, permits quick adjustment of the spacing between the side walls 18 and 20 so that the channel 16 may selectively either grip or release a pair of rails attached to the base of a camera body (not shown). Each respective side wall 18 and 20 is preferably angled upward and inward to facilitate engagement with such rails. In this manner, photographic equipment may be quickly engaged or released from a tripod or other support.

Figure 4:
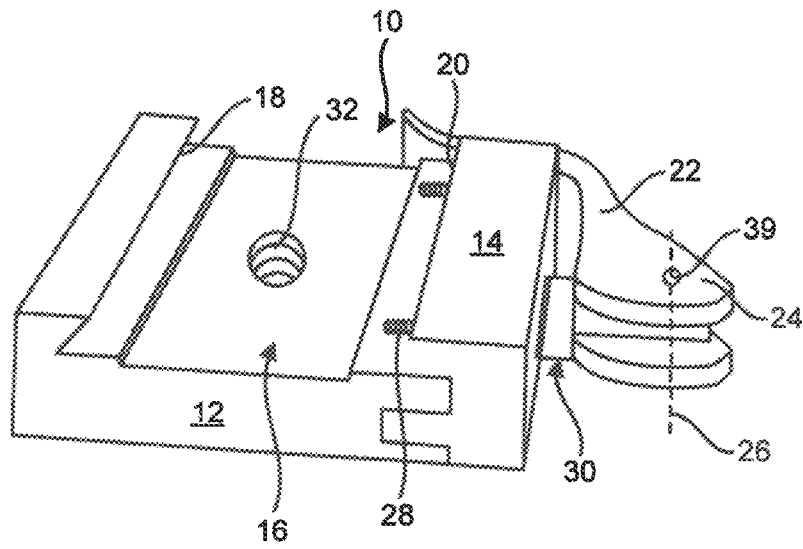
FIG. 4 illustrates the lever of the clamp in an engaged position.

The lever 22 may be a cam lever that includes a cam portion 24 that rotates about a pivot axis 26 as the cam lever is moved between a first, unlocked position (shown in FIG. 1) and a second, locked position (shown in FIG. 4). The cam portion 24 has an asymmetrical shape about the pivot axis 26 so that the lever 22 pushes the adjustable arm 14 inward as the lever 22 is moved from a first position for releasing photographic equipment from the clamp 10 to a second position for gripping photographic equipment to the clamp 10. Conversely, as the lever 22 is moved from the second position to the first position, a pair of counterforce springs 28, housed within the body 12, push outward on the adjustable arm 14 so that the channel 16 expands.

Figure 6:
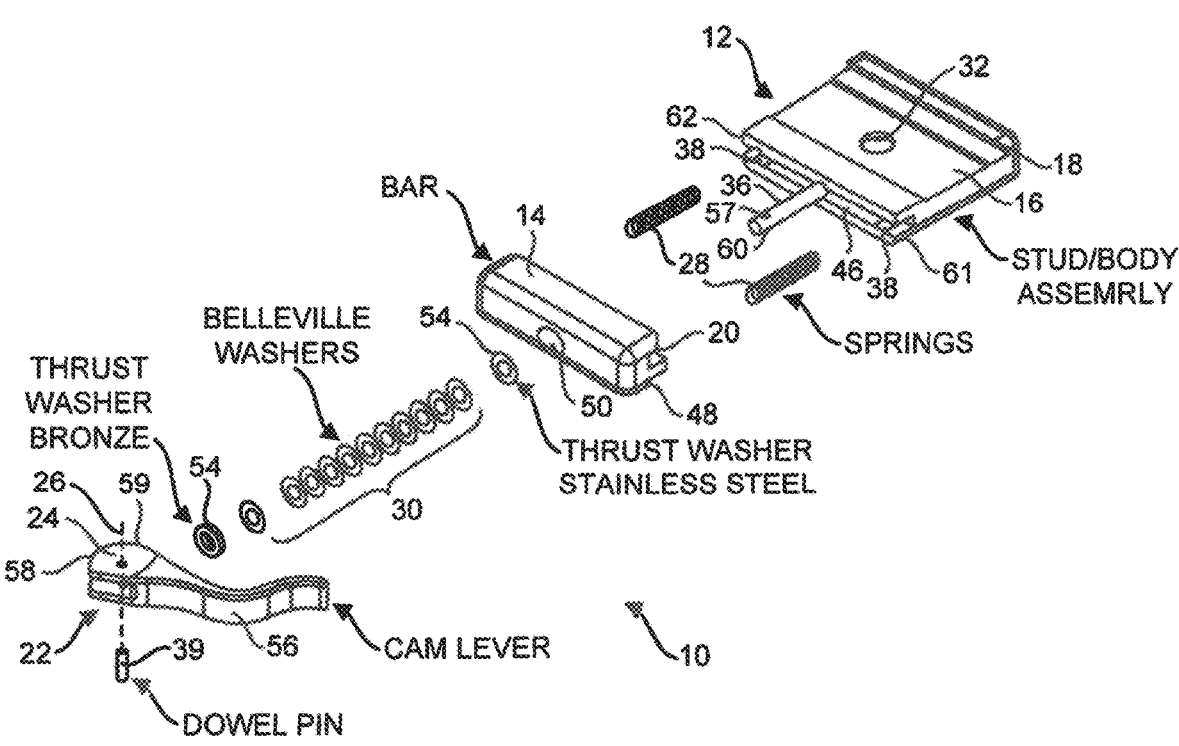
FIG. 6 illustrates an exploded view of the clamp of FIG. 1.

The outwardly directed force applied by the springs 28 on the adjustable arm 14 is at a maximum when the lever 22 is in the second position, i.e., when the channel 16 is intended to grip photographic equipment. The force applied by the springs 28 therefore acts to loosen the grip on the photographic equipment. The clamp 10 includes a locking member 30 that prevents any outward movement of the adjustable arm 14 that might otherwise result from the force applied by the springs 28. The locking member 30 may be substantially compressible, such as a compression spring, and interposed between the lever 22 and the adjustable arm 14. FIG. 6, for example, shows a series of Belleville washers 30 that together operate as a compression spring. Alternatively, the locking member 30 could be a helical compression spring or any other appropriate force generating member. Further, the locking member 30 may be interposed between the adjustable arm 14 and the body 12. The locking member 30 may preferably apply an inwardly-directed force on the adjustable arm 14 that increases as the lever 22 is moved from the first position towards the second position. The inward force applied on the adjustable arm 14 by the locking member 30 may preferably be greater than the outward force applied by the springs 28 when the lever 22 is in the second position. Also, the lever 22 may include an over-center detent position.

The manner in which clamp 10 may be operated is seen in reference to FIGS. 1-4. FIG. 1 shows the clamp 10 where the lever 22 is in the first position, i.e., the released position. In this first position, the adjustable arm 14 is spaced apart from the body 12 by an applied force from the springs 28, thus widening the channel 16 to allow the insertion or removal of photographic equipment. The cam portion 24 is oriented such that the locking member 30, which in this instance is a series of Belleville washers that act as a compression spring, is sufficiently relaxed so as to not apply a sufficient inward force on the adjustable arm 14 to overcome the outward force of the springs 14. In this position, the cam portion 24 preferably abuts the locking member 30 at a minimum distance d1 from the pivot axis 26. As the lever 22 is moved from the first position toward the second position, the cam portion 24 pushes the locking member 30 and the adjustable arm 14, inward. The locking member 30 begins to compress to counterbalance the outward force of the springs 28 applied to the adjustable arm 14 as it moves inward.

Figure 2:
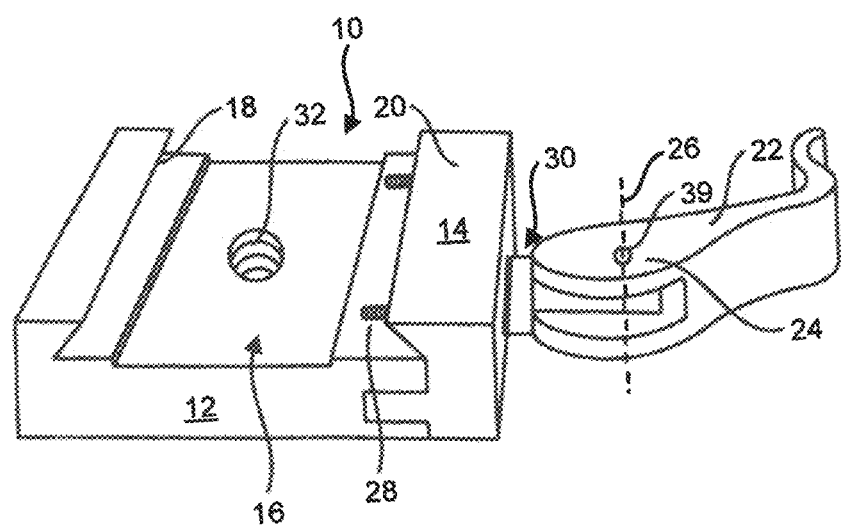
FIG. 2 illustrates the lever of the clamp in a first intermediate position.

FIG. 2 shows the lever 22 in a first intermediate position where the lever 22 has been moved to a position where the adjustable arm 14 is flush with the body 12. In this position, the forces applied by the locking member 30 and the springs 28 counterbalance each other; further movement of the lever 22 towards the second position, however, causes the inward force applied by compression of the locking member to increase over that of the springs 28 because the adjustable arm 14 may not move any further while the locking member 30 will continue to compress.

Figure 3:
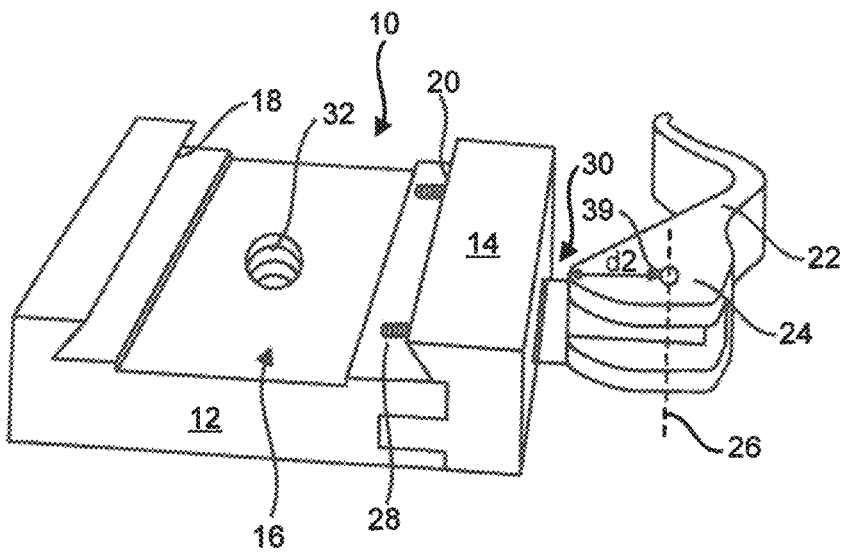
FIG. 3 illustrates the lever of the clamp in a second intermediate position.

FIG. 3 shows the lever 22 in a second intermediate position where the locking member 30 is applying a maximum inward force on the adjustable arm 14. This is a position where the cam portion 24 preferably abuts the locking member 30 at a maximum distance d2 from the pivot axis 26. In this position, the inward force applied by the locking member 30 to the adjustable arm 14 is substantially greater than the outward force applied by the springs 28. Further movement of the lever 22 toward either the first or second position will relax the locking member 30 with respect to the maximum inward force as the distance from the pivot axis 26 on which the locking member 30 abuts the cam portion 24 decreases.

FIG. 4 shows the lever 22 in the second position. In this position, the lever 22 is in an over-center detent configuration such that movement of the lever 22 toward the first position will act to compress the locking member 30. Thus, the locking member 30 resists movement of the lever 22 toward the first position. Preferably, when in this position, the inward force applied by the locking member 30 to the adjustable arm 14 is still greater than the outward force applied by the springs 28. Alternatively, the two forces could be precisely counterbalanced. In this manner, the adjustable arm 14 is locked into place because the springs 28 do not apply a sufficient force to overcome that force applied by the locking member 30.

The locking member 30 preferably applies a force to the adjustable arm 14 and the lever 22 that varies with the position of the lever 22. The force preferably increases as the lever is moved from the first position towards the second position. The force preferably reaches a maximum before the lever reaches the second position. More preferably, the force applied by the locking member 30 is less than that maximum when in the second position, so that the force applied by the locking member also increases as the lever is moved from the second position towards the first position.

5

Figure 5:
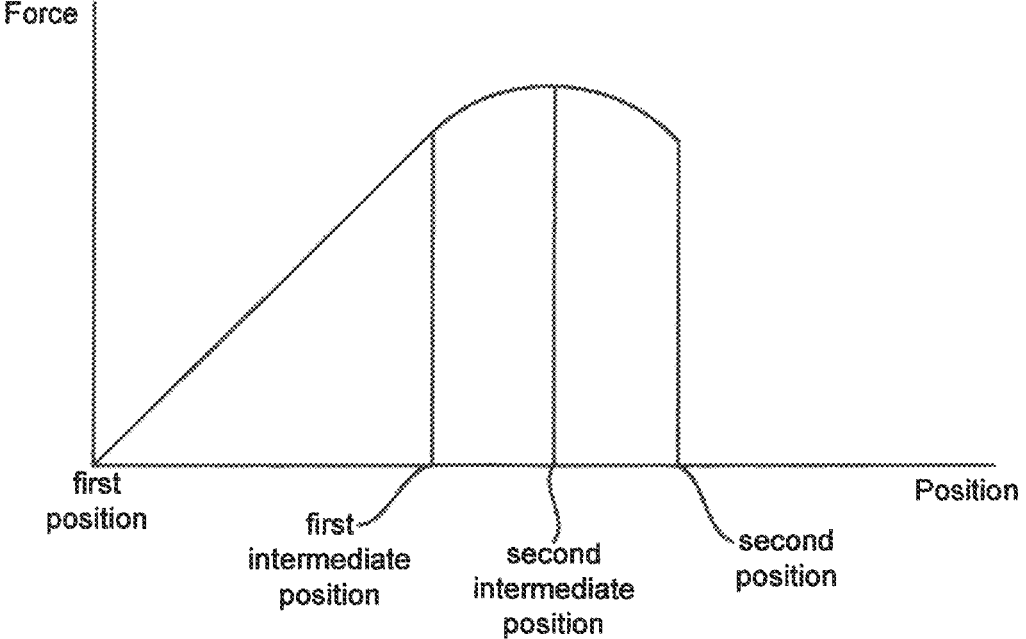
FIG. 5 illustrates a force profile generated by the clamp.

The locking member 30 together with the lever 22 may, for example, achieve a force profile generally depicted in FIG. 5. This figure indicates that as the lever 22 is moved over a range of motion extending from the first position to the second position, the force increases to a maximum at a second intermediate position and then decreases as the lever 22 continues to the second position.

It should also be noted from this figure FIG. 5 the adjustable arm 14 may cease its inward motion at a first intermediate position before the locking member has reached its maximum force. This may be preferable so that the inward force applied by the locking member 30 on the adjustable arm 14, when the lever is in the second position, can still overcome the outward force applied by the springs 28 even though the force applied by the locking member 30 has fallen from its maximum. It should be further noted that the movement of the adjustable arm 14 corresponds to the movement of the lever. Also, the maximum force may be at the end of the movement range of the lever.

The force profile depicted in FIG. 5 is smooth, i.e., as the lever is moved from the first position, the force increases continuously to a maximum and decreases continuously until the lever reaches the second position. Alternative embodiments may design a lever that permits the force profile to decrease at certain intervals on the lever's path from the first position to the second intermediate position of maximum force, or to increase on the lever's path from that second intermediate position to a lesser force at the second position, or both.

Though the force profile depicted in FIG. 5 is achieved by using a lever 22 in conjunction with the locking member 30, it should be understood that levers of other shapes may be used to achieve the same or similar force profiles. Further, other structures may be substituted for the lever, such as a plunger or a button or a screw.

Referring to FIG. 6, the clamp 10 may comprise a body 12 constructed of any sufficiently rigid material such as metal, plastic, or composite material. The body 12 preferably defines the side wall 18 of the channel 16 as well as a central opening 32 by which the clamp 10 may be secured to a tripod or other support using a bolt, pin, or other similar protrusion. The opening 32 may be threaded to receive a bolt, or alternately may not be threaded such that interconnection with a tripod or other support may be made using a wing nut or other fastener.

The body 12 may also define a sleeve into which the stud 36 may be inserted. The stud 36 and the sleeve are preferably threaded to ensure a rigid connection. If further means are desired to ensure a rigid connection between the stud 36 and the body 12, they may each define aligned holes and through which a fastening pin may be inserted. Alternatively, a thread locking compound may be used. The body preferably also defines two symmetrically opposed sockets 38 into which the springs 28 may be inserted. The sockets 38 and the sleeve may also preferably be parts of a slot 46 defined by the body 12.

The adjustable arm 14 preferably defines the side wall 20 as well as a ledge 48 sized to fit snugly within the slot 46. The springs 28, when inserted into their respective sockets 38 will push on the ledge 46 as the adjustable arm is engaged with the body 12. The adjustable arm 14 may also define a partially bored opening 50 so that the opening 50 may simultaneously retain the locking member 30 within itself while permitting the stud 36 to extend completely through the adjustable arm 14.

The locking member 30 may comprise a plurality of adjacent Belleville washers that together function as a compression spring. Optionally, a thrust washer 54 may be located at either or each end of the plurality of Belleville washers.

The lever 22 may comprise a handle portion 56 and a yoke 58. The yoke 58 may also define the cam portion 24 that operates the locking member 30 as the lever 22 is rotated. The yoke 58 preferably receives the distal end 60 of the stud 36. The stud 36 may be secured to the yoke 58 using a dowel pin 39 that is inserted into aligned openings formed by the stud 36 and the yoke 58, respectively.

While a lever clamp provides a quick release mechanism for securing devices to the lever clamp, with substantial device weight being secured by the lever clamp tends to result in slippage of the device or otherwise becoming inadvertently disengaged. Without careful handling of the lever clamp, the lever may become inadvertently released, thereby releasing whatever is being secured by the lever clamp. Also, the lever clamp provides a friction-based position retention using a set of one or more Belleville springs together with a cam lever profile, but the level of friction force tends to vary depending on manufacturing tolerances. For higher forces, such as a rifle recoil, the maximum frictional force provided by the lever clamp may be insufficient to safely and reliably provide a sufficient force to maintain a device from slipping out of a set position. To adjust the friction provided by the lever clamp may also require difficult adjustment mechanisms to accommodate various sizes of the rails, or otherwise, that as secured thereto.

Figure 7:
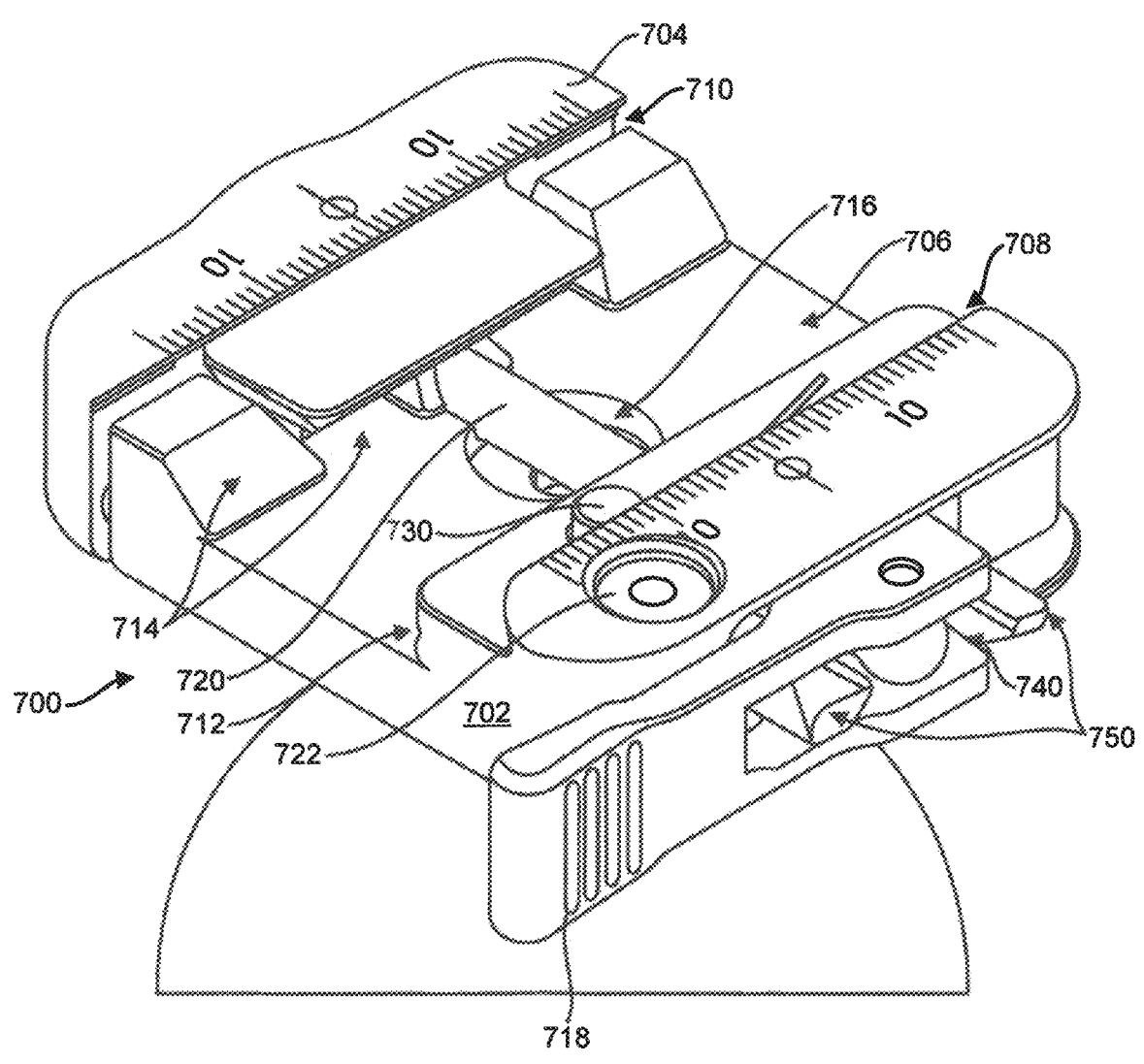
FIG. 7 illustrates a modified clamp with a pin.

Referring to FIG. 7, a modified clamp may include a clamp 700 that comprises a body 702 and an adjustable arm 704 that together form a channel 706 having opposed upper side walls 708 and 710 and/or lower side walls 712 and 714. The body 702 may define an opening 716 through which the clamp 700 may be secured to the upper portion of a tripod, a ball head, or other support with a screw. The adjustable arm 704 is slidably engaged using a lever 718 and a shaft 720 passing through the body 702. Movement of the adjustable arm 704 selectively adjusts the width of the channel 706 and is accomplished through manual operation of the lever 718 fastened to the distal end of the shaft 720. The lever 718 engaged with the adjustable arm 704, permits quick adjustment of the spacing between the side walls so that the channel 706 may selectively either grip or release a pair of rails attached to the base of a camera body, rifle, or other device. Each respective side wall is preferably angled upward and inward to facilitate engagement with such rails. In this manner, a device may be quickly engaged or released. The body may also include a level bubble 722 in an upper surface thereof.

Figure 8:
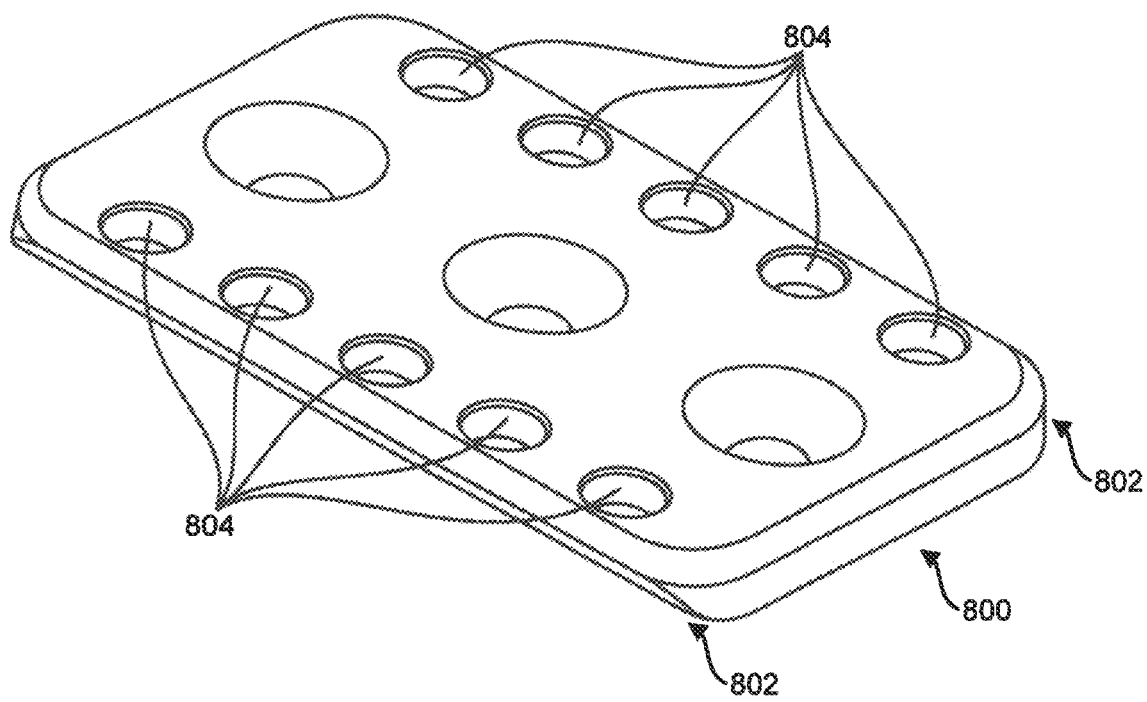
FIG. 8 illustrates a modified plate for the clamp of FIG. 7.
Figure 9:
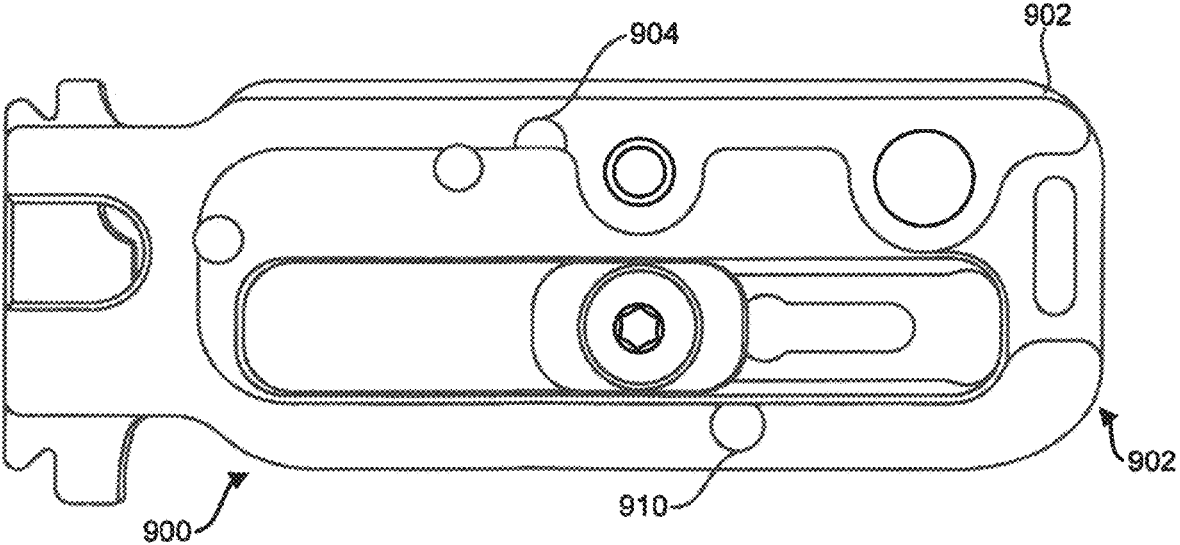
FIG. 9 illustrates a modified bracket for the clamp of FIG. 7.

To provide additional securement to devices secured therebetween, the clamp 700 preferably includes a pin 730 selectively extending proud from one of the supporting surfaces of the clamp 700. The pin 730 may be biased upwardly, such as based upon a spring, or otherwise the pin 730 may be raised and lowered in response to an adjustment mechanism. The pin 730 may have any desired profile, such as oval, round, rectangular, square, or otherwise. There may be a plurality of pins 730 selectively extending proud from one or more of the supporting surfaces of the clamp 700. Referring to FIG. 8, a plate 800 with inclined edges 802 may include one or more openings 804 defined therein sized and positioned such that when engaged with the clamp 700, the pin(s) 730 extend at least partially through the corresponding opening(s) 804. Referring to FIG. 9, a bracket 900 with inclined edges 902 may include one or more openings 904 defined therein sized and positioned such that when engaged with the clamp 700, the pin(s) 730 extend at least partially through the corresponding opening(s) 904. As it may be observed, with the plate 800/bracket 900 engaged with the clamp 700 and the clamp 700 in a locked position securing the plate 800/bracket 900 therein, together with the pin(s) 730 engaged by the opening(s) 804/opening(s) 904, the plate 800/bracket 900 together with anything supported therein is maintained from slipping. Preferably, the pin(s) 730 may be manually depressed so that the top of the pin(s) 730 are flush with the respective surface to accommodate a plate/bracket that does not include a suitable opening therein to engage with the pin(s). In this manner, the clamp 700 may support structures that include suitable openings to engage the pin(s) 730 and structures that to not include suitable openings to engage the pin(s) 730. Alternatively, the clamp may include a pin that extends in from the side of the clamp within the channel area, which engages with openings defined by the side of the plate/bracket/or otherwise secured therebetween.

Figure 10:
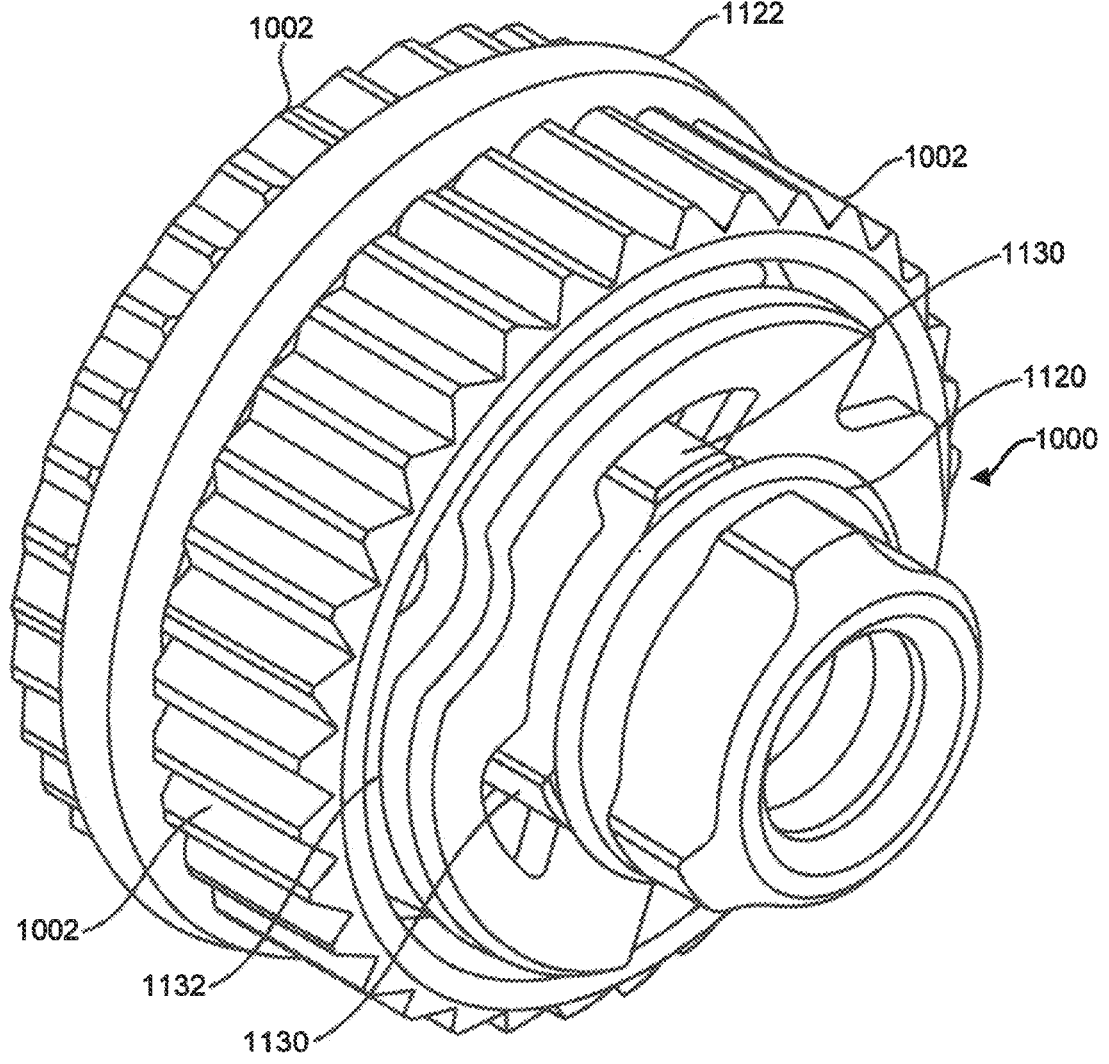
FIG. 10 illustrates a nut for the clamp of FIG. 7.

Referring to FIG. 10, rotation of the lever 718, or movement of a knob or otherwise, changes the position of the shaft 720 which is interconnected with a corresponding nut 1000. The nut 1000 applies a spring force to the adjustable arm 704 in combination with the body 702, such that when the lever is in a "closed" position, there is positive pressure being applied to the device secured therein. It is to be understood that the adjustable arm 704 and/or the nut 1000 may be repositioned to the same side of the body 702 as the lever, if desired. The nut 1000 may include a serrated profile 1002, such as 34 teeth, that engages with a serrated profile defined by the adjustable arm 704. The nut 1000 may be disengaged from the adjustable arm 704, rotated either to effectively shorten the operative length of the shaft 720 or to effectively lengthen the operative length of the shaft 720 to modify the position of the adjustable arm 704 with respect to the shaft 720. After rotation of the nut 1000, the nut is again engaged with the adjustable arm 704 with the serrated profile 1002 inhibiting it being freely rotatable. The clamp 700 may further include a set of one or more springs, shown below, that permits effective modification of the force applied by the clamp in relatively small increments, provides a fine adjustment but also locks the selected setting in place during use.

Figure 11:
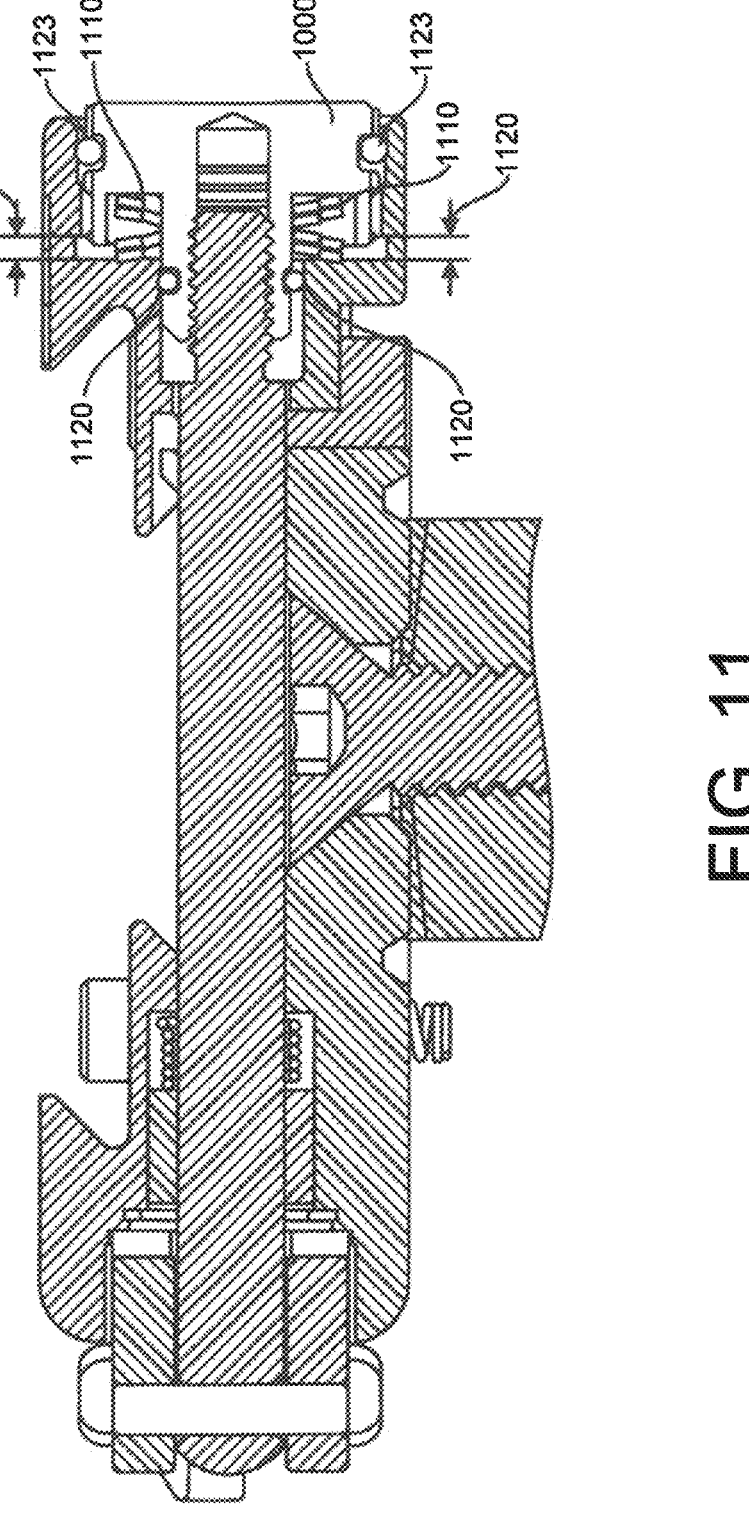
FIG. 11 illustrates a cross sectional view of the clamp of FIG. 7.
Figure 12:
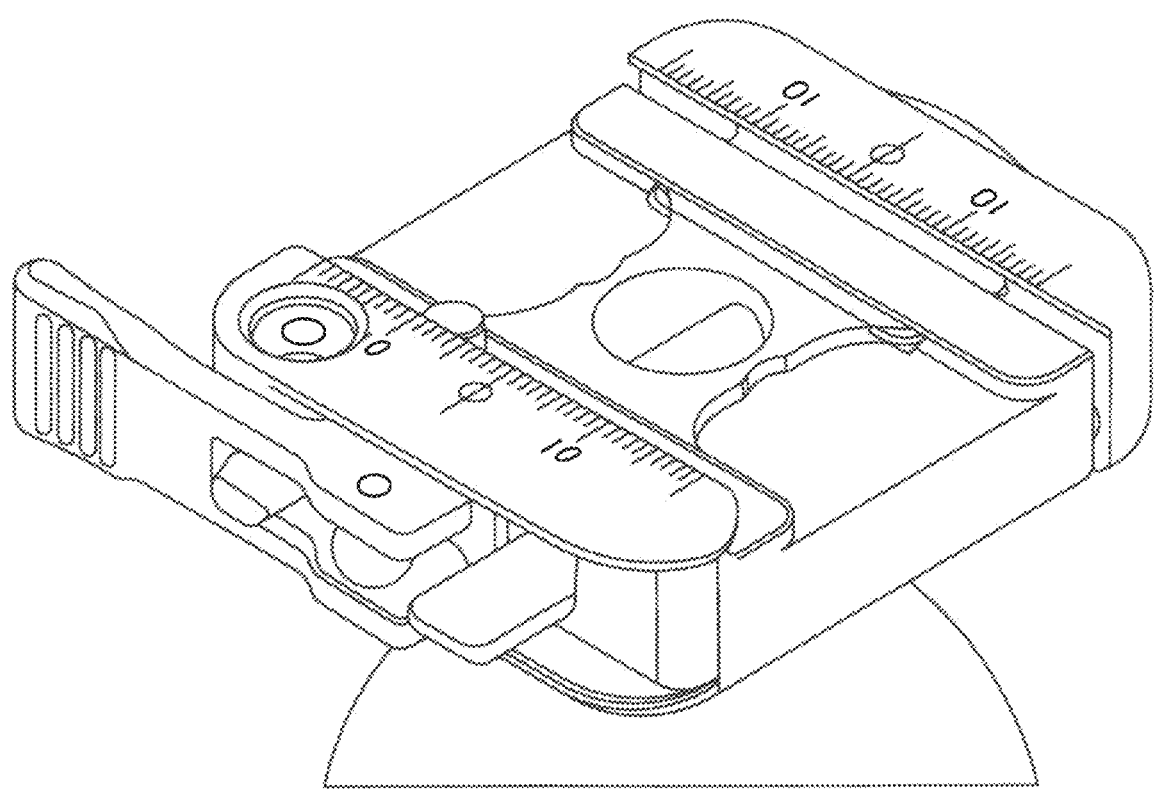
FIG. 12 illustrates another exemplary clamp.

Referring also to FIG. 11, the nut 1000 may also act as a spring compression limiter, inhibiting the user from over-tightening the clamp and thereby permanently deforming the springs. For example, a pair of springs 1110 may be included in the clamp 700, with the nut 1000 limiting the compression so that a small gap 1123 remains between the nut 1000 and the adjustable arm 704. The nut 1000 may include a pair of O-rings 1120, 1122 that inhibit contaminates from the spring mechanism while also inhibiting the springs from falling off during disassembly. The nut 1000 may include a tri-lobe structure 1130 that inhibits rotation of clover-shaped disc springs 1132, while also increasing the retention of the O-ring 1120. It is noted that the shaft 730 may act as a recoil lug for NATO/Picatinny rail, such as described in U.S. Pat. No. 10,883,650, incorporated by reference herein. It is noted that the shaft 730 may be included within the body 702 such that it doesn't extend above a clamping surface. It is noted that the dual clamping levels may be replaced by a single level, such as described in U.S. Pat. No. 6,773,172, incorporated by reference herein. Referring to FIG. 12, an exemplary clamp without dual clamping levels, nor Picatinny compatibility is illustrated, that retains the pin(s) structure.

Figures 13, 14, 15, 16:
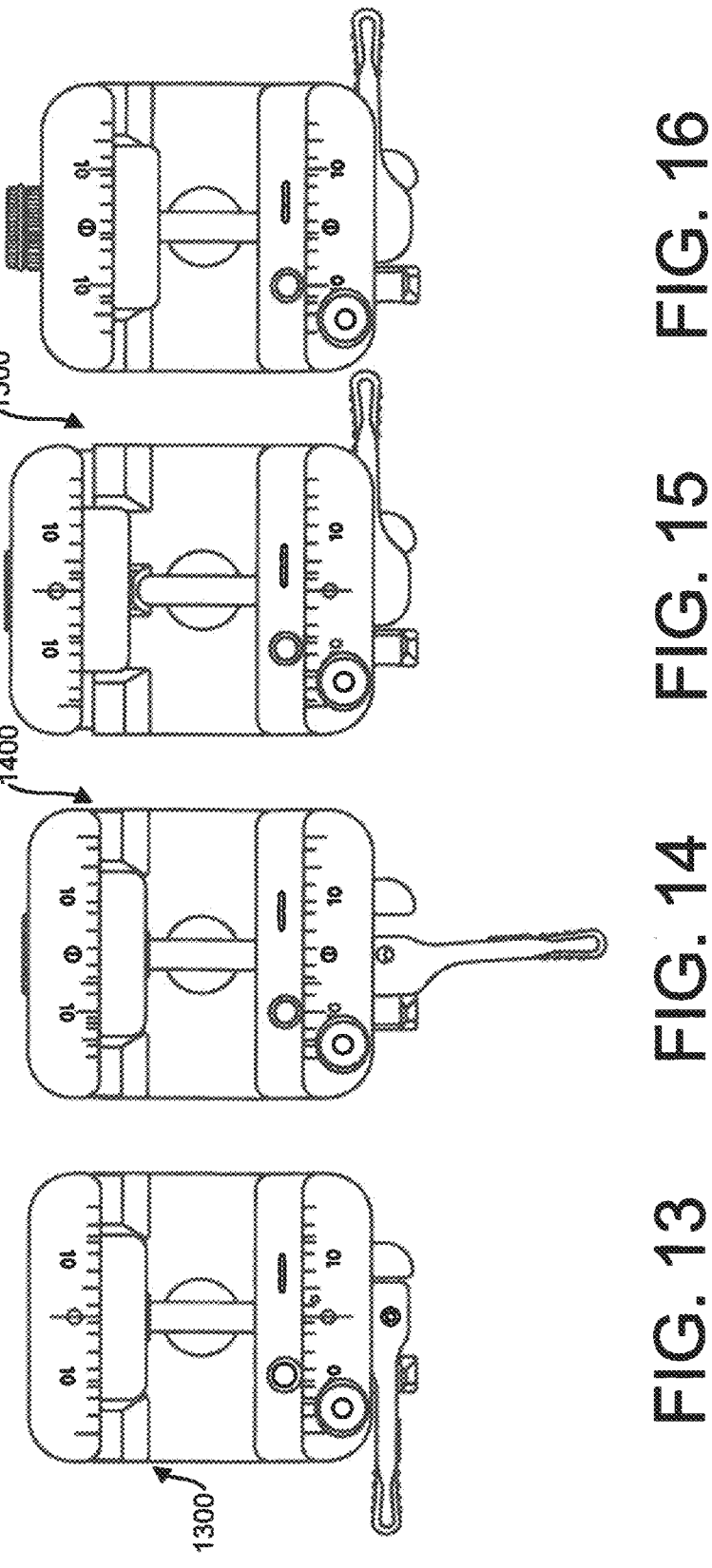
FIG. 13 illustrates the clamp of FIG. 7 in a closed position.
FIG. 14 illustrates the clamp of FIG. 7 in a sliding position.
FIG. 15 illustrates the clamp of FIG. 7 in an opened position.
FIG. 16 illustrates the nut of the clamp of FIG. 7 in a retracted position.

Referring again to FIG. 11 and to FIGS. 13-15, the surfaces of the clamp 700 include three distinct planes, that, when combined with one or more springs, provides for vibration resistance. The three planes correspond with three positions of the jaw, namely, a closed position 1300 (see FIG. 13), a sliding position 1400 (see FIG. 14), and an opened position 1500 (see FIG. 15).

Referring again to FIG. 7, the lever 718 includes an elongate slit 740 that interfaces with a latching assembly 750. The latching assembly 750 inhibits inadvertent opening of the lever from the closed position 1300, to the sliding position 1400 or opened position 1500. The latch assembly 750 may be configured such that requires two (or more) distinct user inputs to permit uninhibited movement of the lever 718. First the latch assembly 750 is depressed, and then second, while maintaining the latch assembly 750 depressed, the lever 718 is rotated to the sliding position 1400 or opened position 1500. Preferably the latch assembly 750 also acts to articulate the pin(s) 730. Also, the latch assembly 750 does not need to articulate the pin(s) 730, if desired. It is noted that the latch assembly 750 is preferably rotating on an axis different than, such as perpendicular to, the axis of the lever 718. The elongate slit 740 may support other functions, described later. Moreover, the lever 718 is preferably configured in such a manner that the lever 718 cannot be flipped 180 degrees and operate in reverse direction as a result of the position and function of the latch in combination with the indexing pin(s) mechanism.

Figures 17, 18, 19:
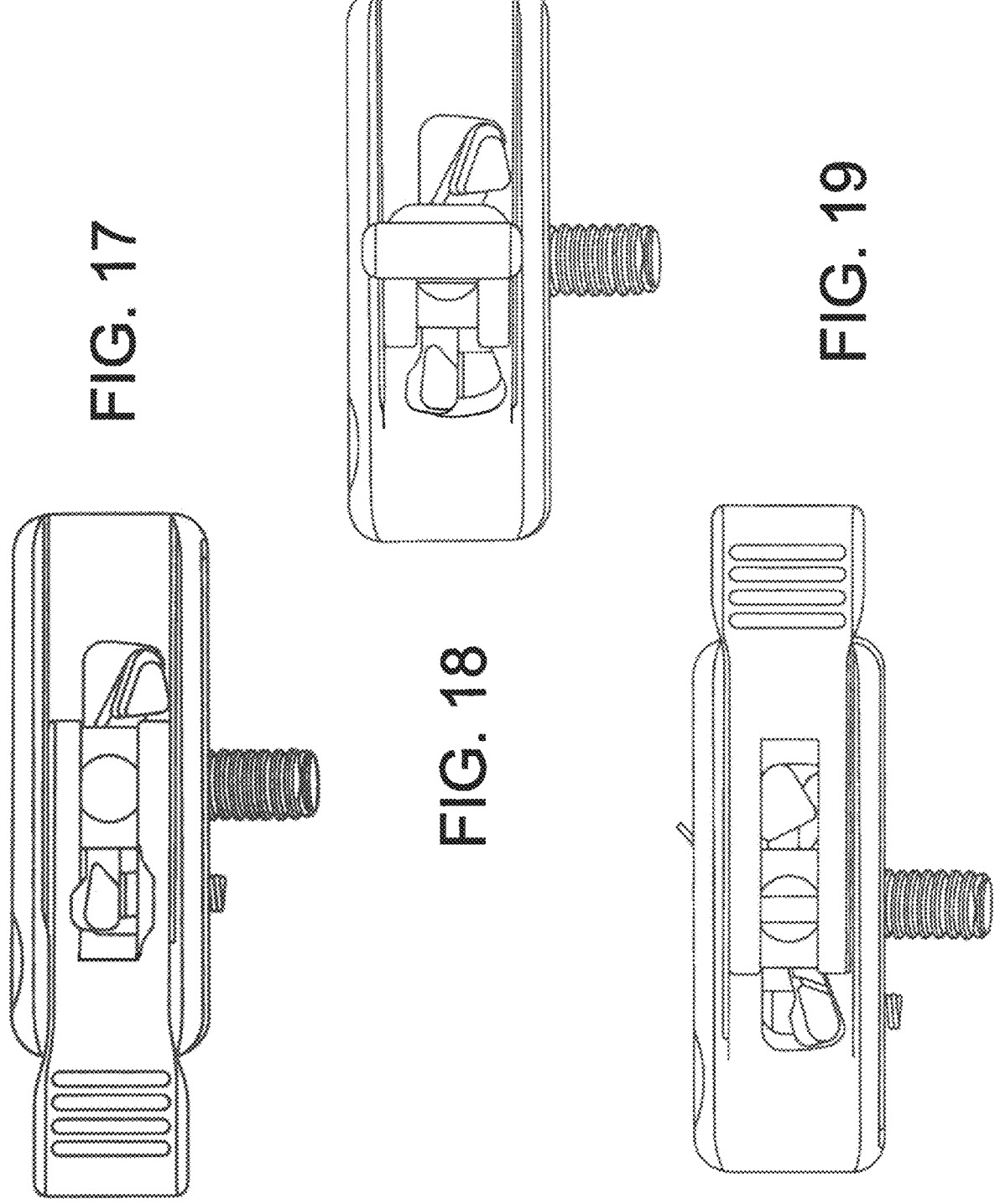
FIG. 17 illustrates the lever and clamp assembly in the closed position.
FIG. 18 illustrates the lever and clamp assembly in the sliding position.
FIG. 19 illustrates the lever and clamp assembly in the opened position.

Referring to FIG. 17, the lever 718 is shown in the closed position 1300 with the latch assembly 750 extending through the elongate slit 740 and inhibiting opening of the lever 718. Also, in the closed position 1300, the lever 718 inhibits the latch assembly 750 from rotating sufficiently to depress the pin(s) 730. This inhibits accidental disengagement of the pin(s) 730 when it is desirable to engage a device secured to the clamp.

Figure 21:
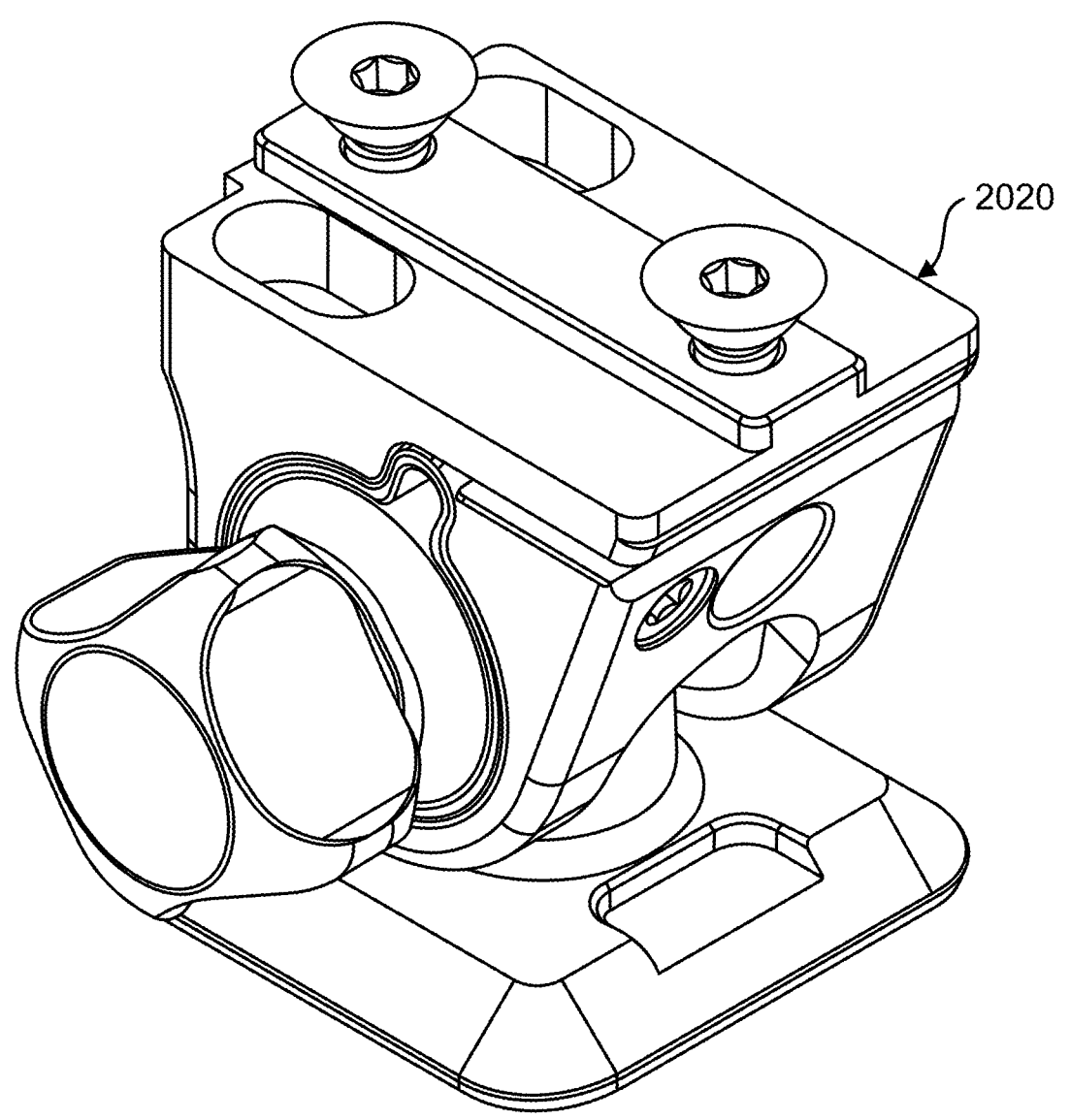
FIG. 21 illustrates the base of FIG. 20.

Referring to FIG. 18, the lever 718 is shown in the sliding position 1400 with the latch assembly 750 extending through the elongate slit 740 and not inhibiting opening or closing of the lever 718. The latch assembly 750 in the sliding position 1400 is free to rotate, but the pin(s) 730 remains extended, such as by one or more springs, to enable to pin(s) 730 to engage a device secured to the clamp 700. The latch assembly 750 may include a plurality of springs. The latch assembly 750 may include a pin spring 2000 that is biased to push the pin(s) 730 to an engaged position. The latch assembly 750 may include a torsion spring 2010 that rotates the latch assembly 750 in a clockwise direction to its resting position. The torsion spring 2010 and the latch assembly 750 preferably do not apply a positive force to engage the pin(s) 730. If, for example, the pin(s) 730 is fully depressed by an external force (e.g., a mounting plate without holes or an obstructed hole), the latch assembly cannot force the pin(s) 730 up into engagement. In other words, the latch assembly depresses the pin(s) if it is engaged, but it does not engage the pin if it is disengaged. Preferably, only the pin spring 2000 engages the pin(s) 730 to provide an extending force, as illustrated in FIG. 21.

Referring to FIG. 19, the lever 718 is shown in the opened position 1500 with the latch assembly 750 extending through the elongate slit 740 and inhibiting closing of the lever 718. By way of example, an exemplary claim is desired in U.S. Patent Publication No. 20220260896 published Aug. 18, 2022; U.S. Patent Publication No. 20120106946 published May 3, 2012; and U.S. Patent Publication No. 20210156508 published May 27, 2021; each of which are incorporated by reference herein in their entirety.

Figure 20:
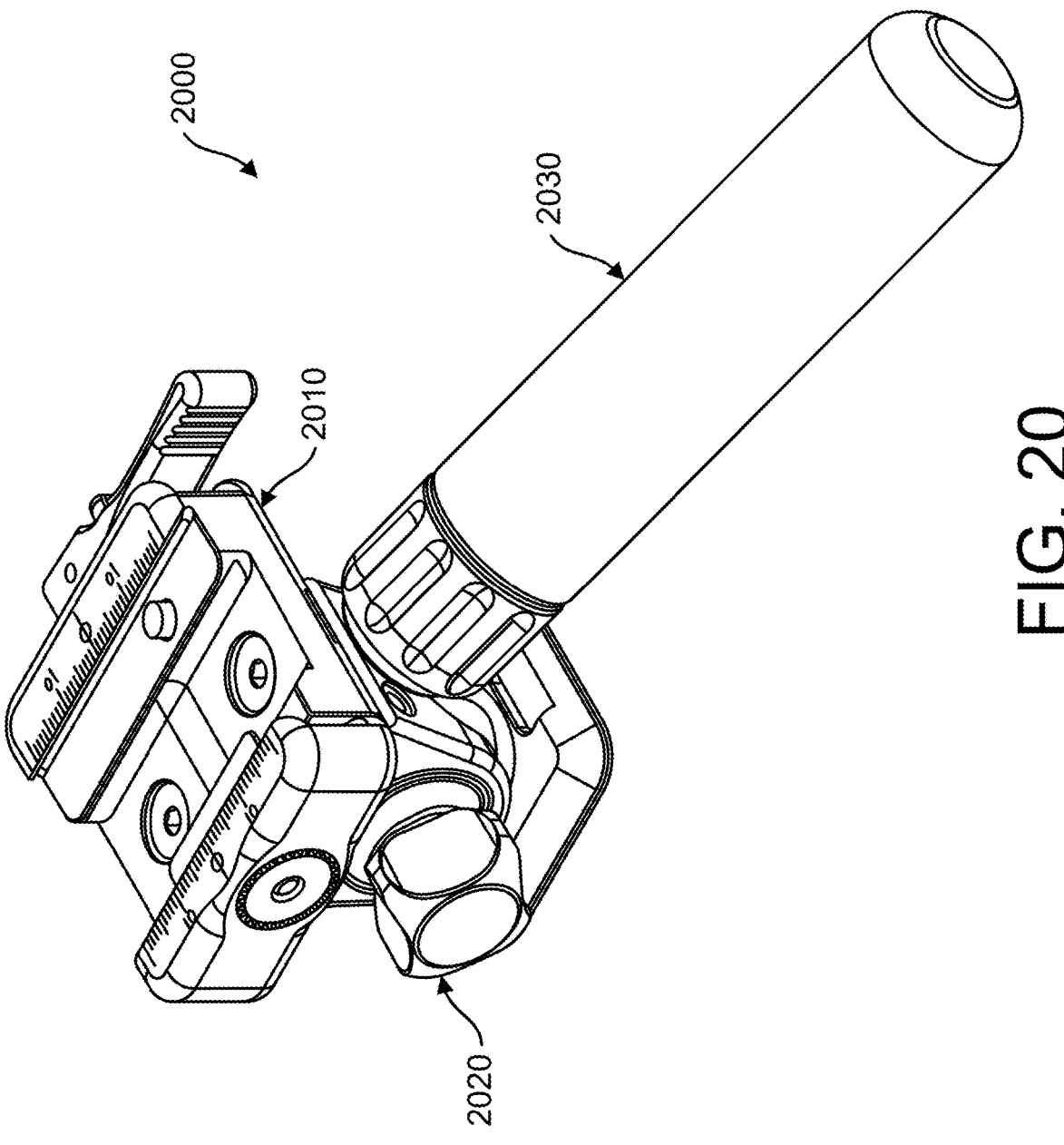
FIG. 20 illustrates a support assembly including a clamp, a base, and an arm.

Referring to FIG. 20, a support assembly 2000 includes a clamp 2010 for a device (e.g., a camera, an imaging device, a firearm, a video camera, etc.), a base 2020 (see also FIG.

Figure 22:
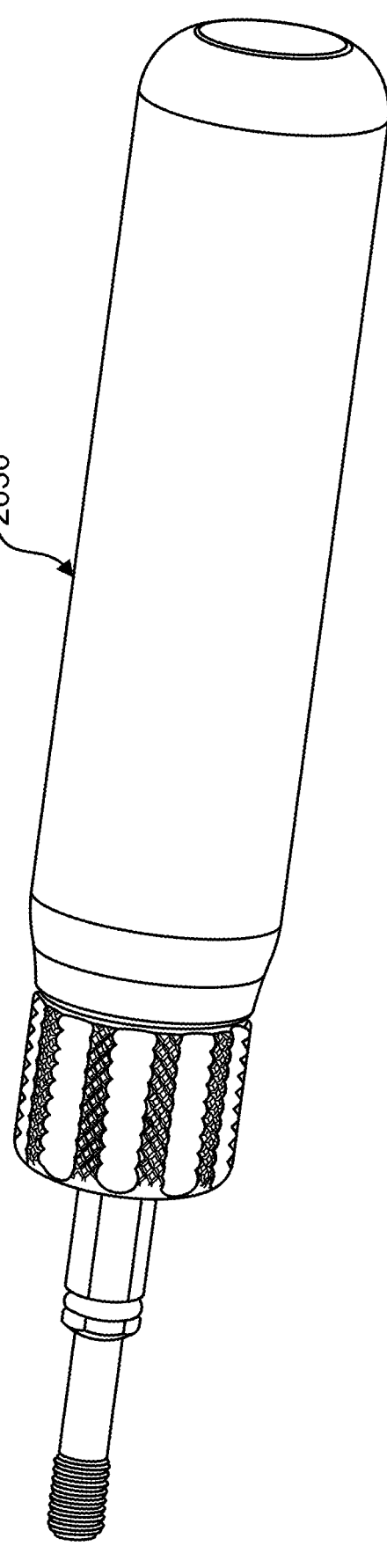
FIG. 22 illustrates the arm of FIG. 20.
Figure 23:
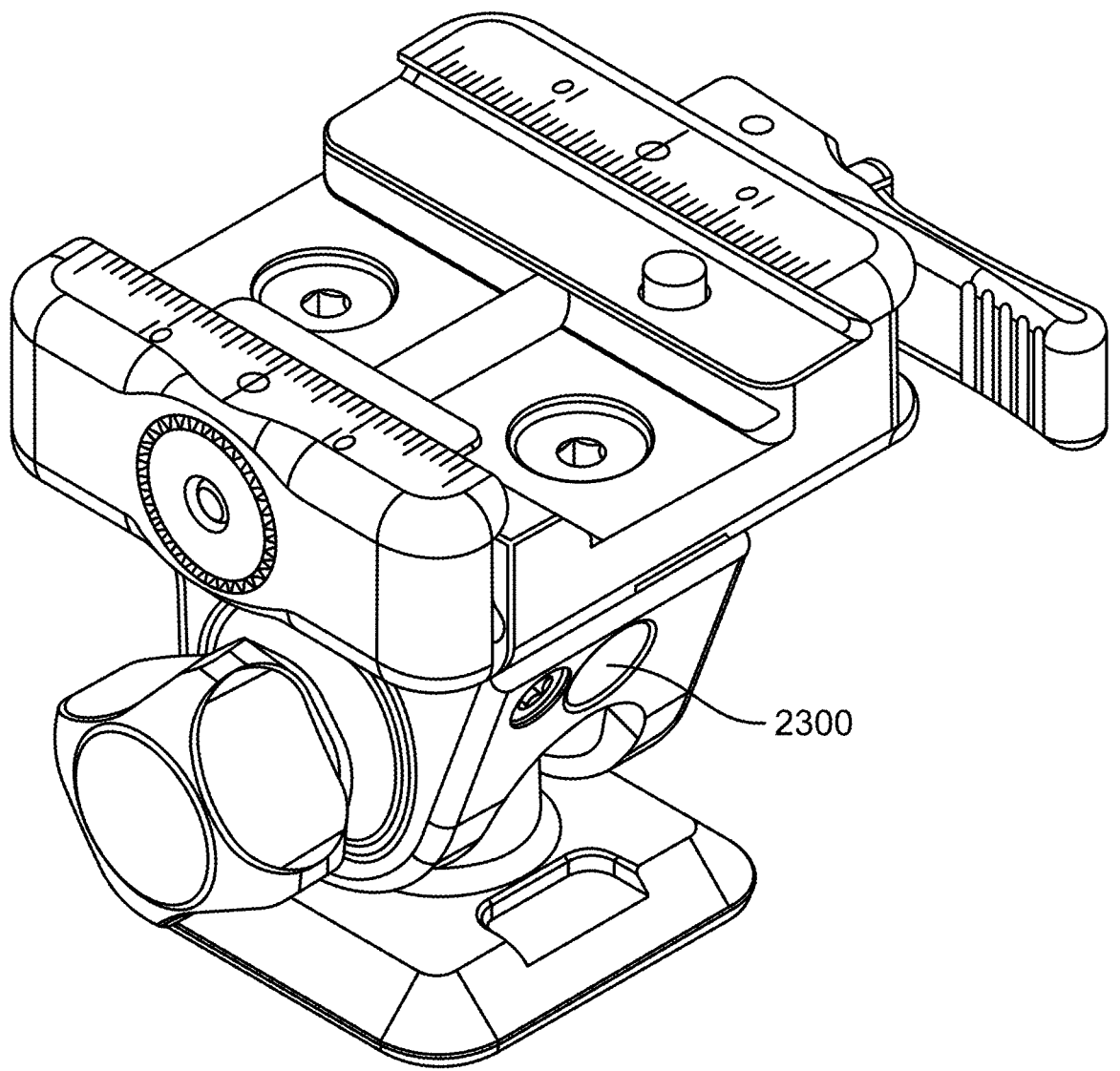
FIG. 23 illustrates the base and the clamp of FIG. 20.

21), and an arm 2030 (see also FIG. 22). The clamp 2010 is detachably engageable with the base 2020. Referring to FIG. 23, the arm 2030 is detachably engageable with the base 2020 through an opening 2300. The clamp 2010 may be any type of clamp, or otherwise any type of securement structure, including a screw. The arm 2030 may be any type of elongate arm, as desired. The base 2020 may be any type of base, including a ball head base (which includes tilt and pan), and preferably a tilt and/or a pan-tilt base. In some embodiments, the clamp may be integrated with the base in such a manner that it is not readily detachable. In some embodiments, the arm may be integrated with the base in such a manner that it is not readily detachable.

Figure 24:
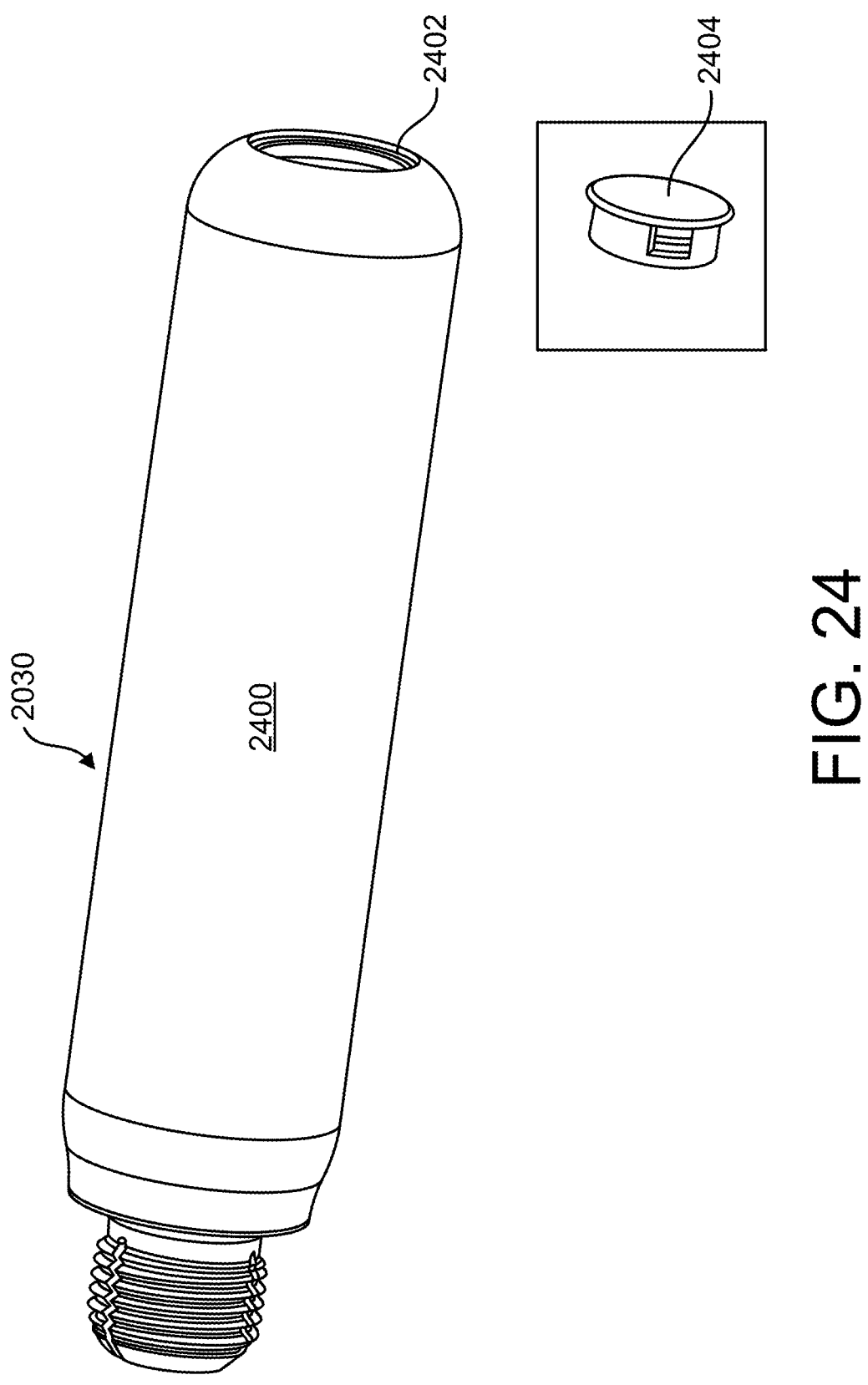
FIG. 24 illustrates a portion of the arm of FIG. 20.
Figure 25:
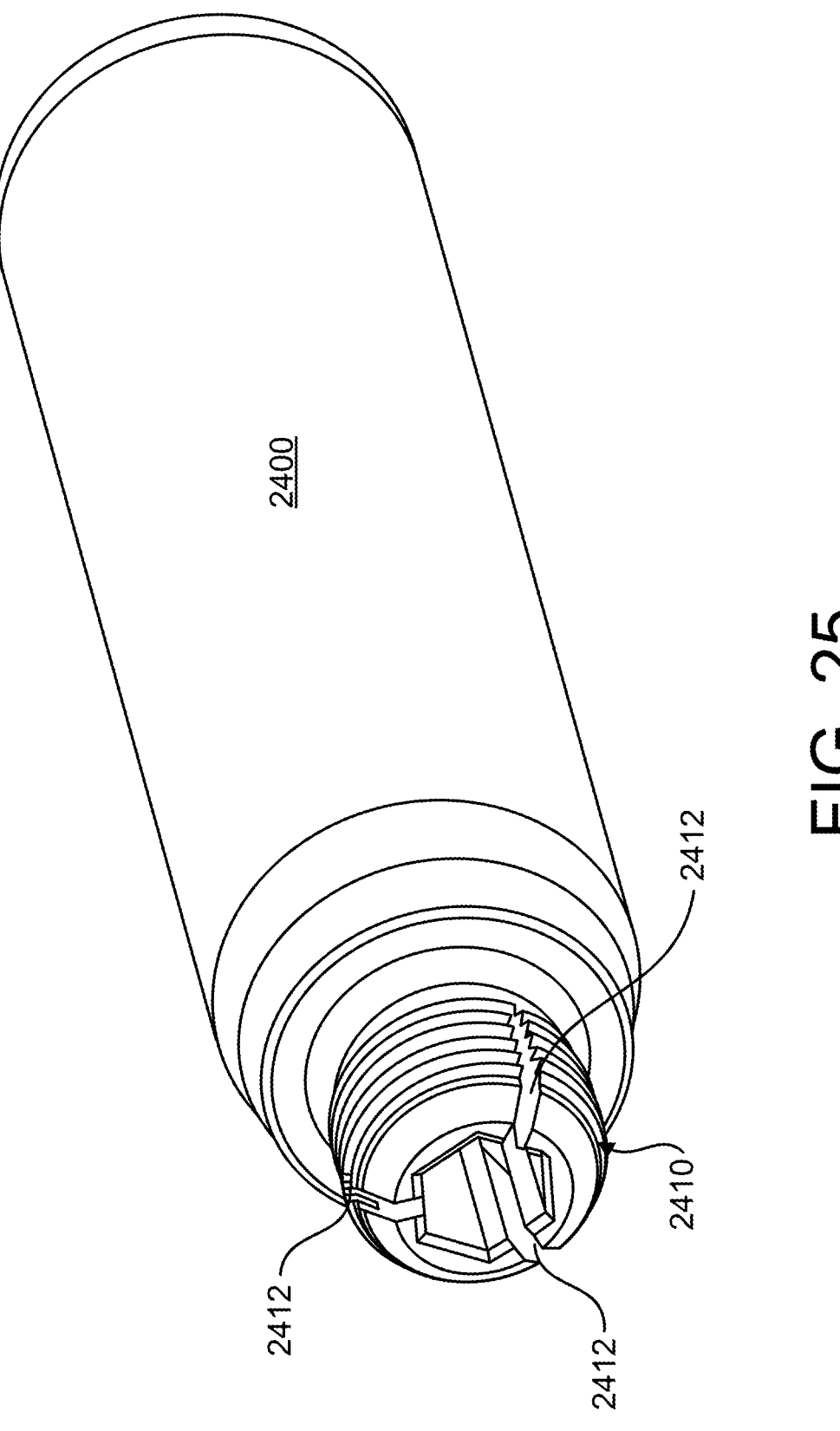
FIG. 25 illustrates a portion of the arm of FIG. 20.
Figure 26:
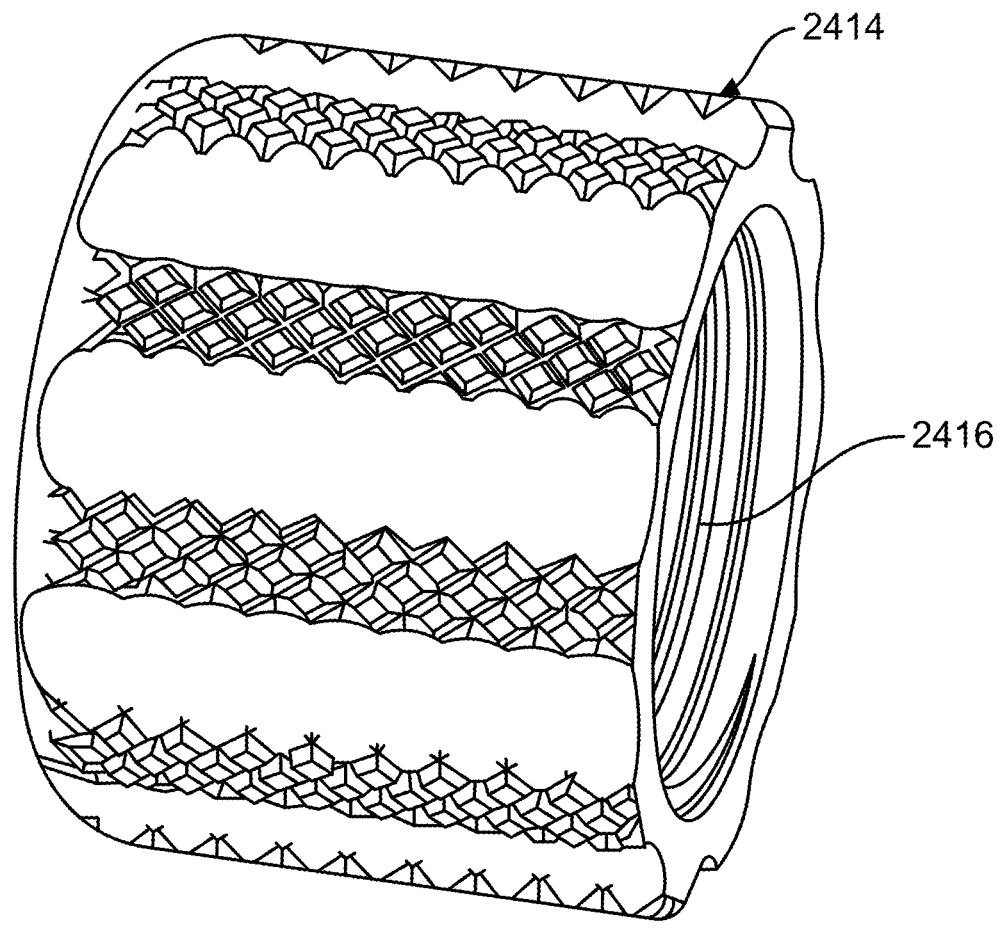
FIG. 26 illustrates a portion of the arm of FIG. 20.
Figure 27:
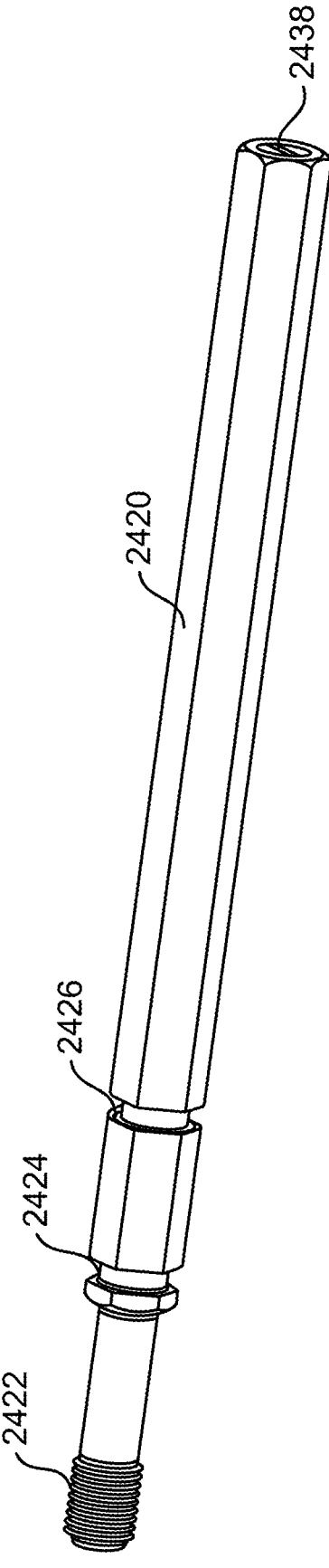
FIG. 27 illustrates a portion of the arm of FIG. 20.
Figure 28:
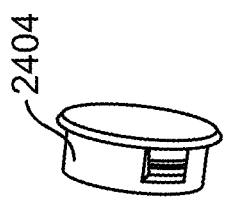
FIG. 28 illustrates a portion of the arm of FIG. 20.
Figure 28:
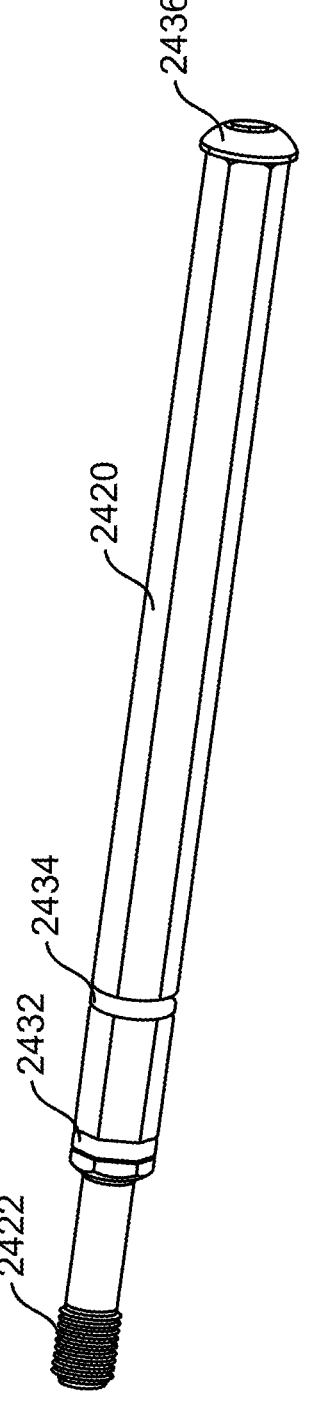

Referring to FIG. 22 and FIG. 24, the arm 2030 includes a handle 2400 that preferably has an elongate cylindrical shape. At a distant end of the handle 2400 it defines an internal lip 2402 into which is detachably secured an end cap 2404. Referring also to FIG. 25, an opposing end of the handle 2400 includes a threaded end 2410. The threaded end 2410 preferably defines one or more slits 2412. Referring also to FIG. 26, an internally threaded 2416 knob 2414 is engaged with the threaded end 2410. As the knob 2414 is secured to the threaded end 2410 the threaded end 2410 is compressed such that the opening defined by the threaded end 2410 contracts. Referring to FIG. 27 and FIG. 28, a shaft 2420 may include a threaded end 2422. The shaft 2420 may define a pair of recesses 2424, 2426. A pair of O-rings 2432, 2434 may be secured within respective ones of the pair of recesses 2424, 2426, where each of the O-rings extends proud of the exterior surface of the shaft 2420. A threaded screw 2436 is secured within a threaded opening 2438.

Figure 29:
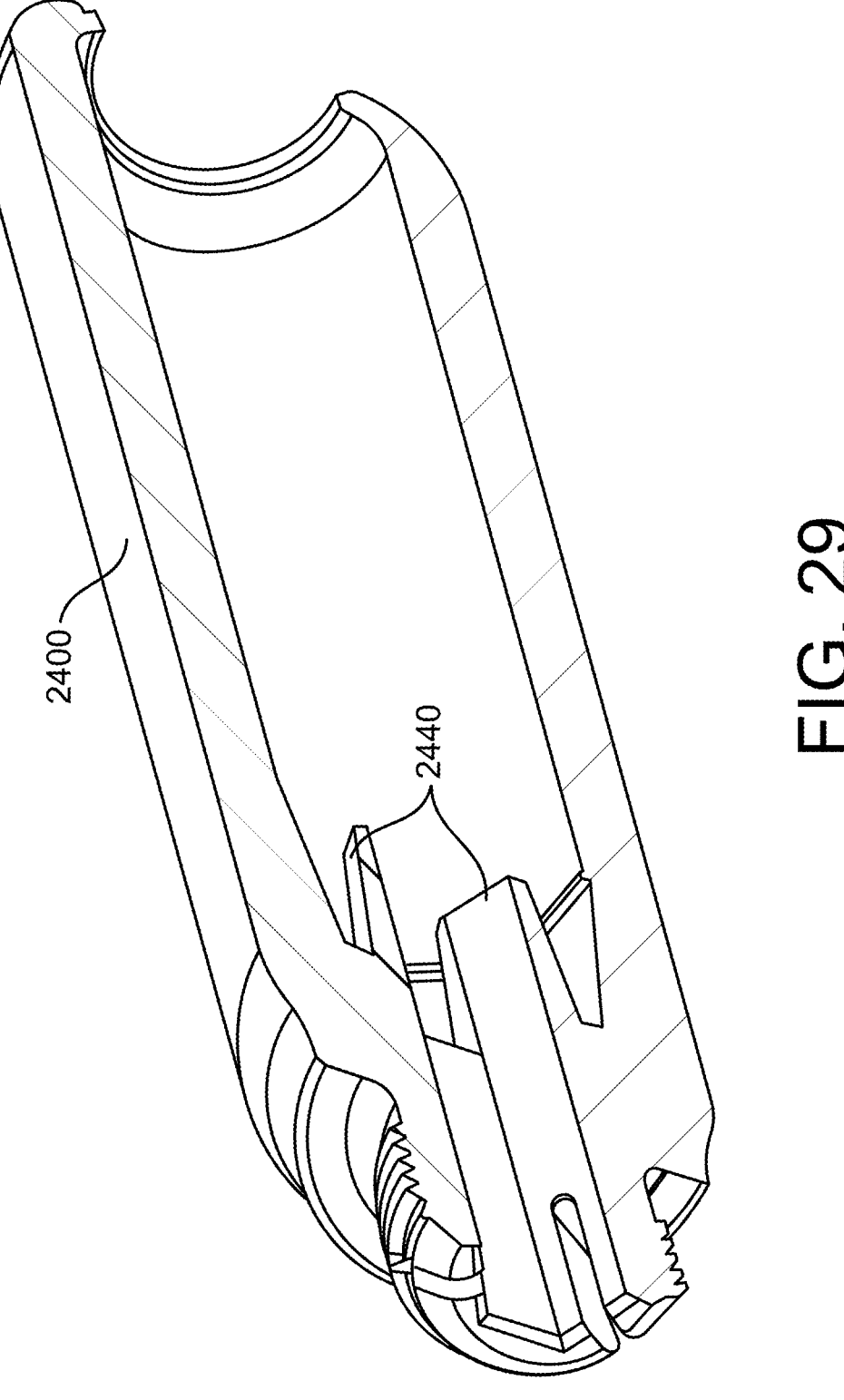
FIG. 29 illustrates a portion of the arm of FIG. 20.
Figure 30:
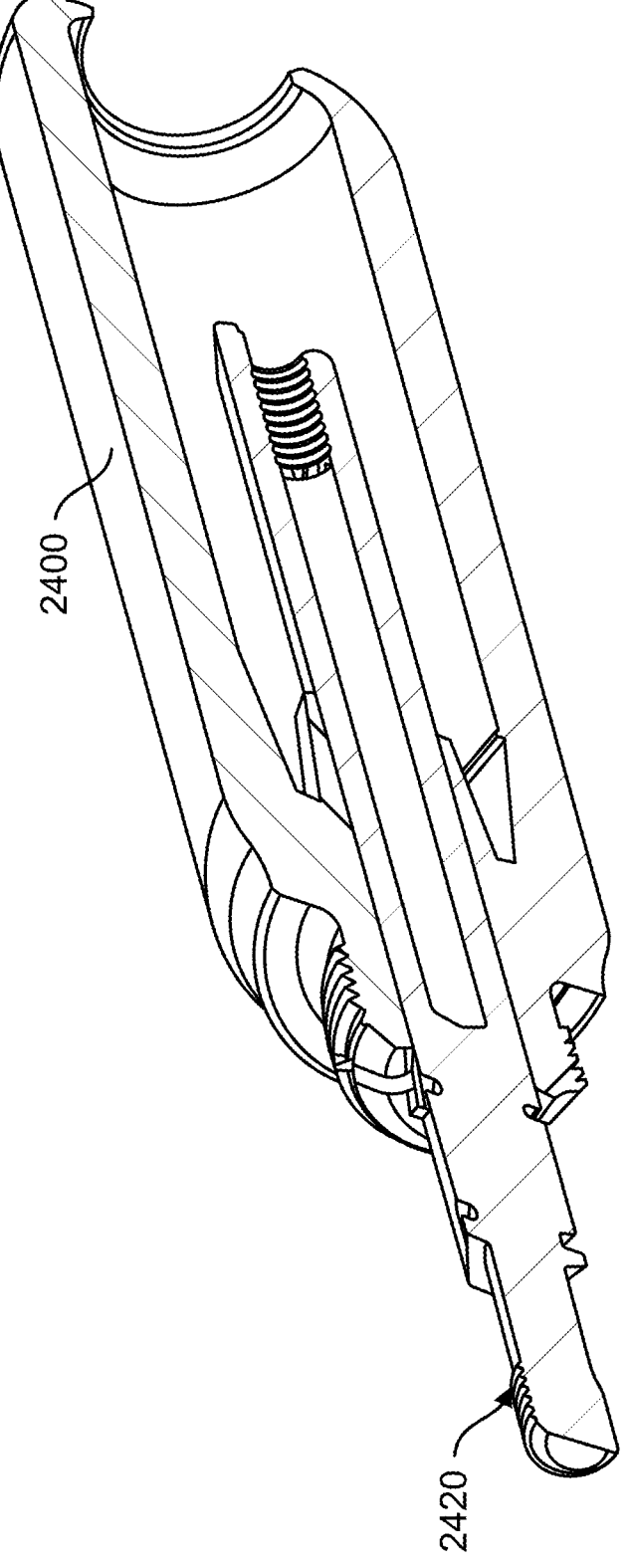
FIG. 30 illustrates a portion of the arm of FIG. 20.

Referring to FIG. 29 and FIG. 30, the shaft 2420 is inserted within the handle 2400 and the knob 2414 is rotatably secured to the threaded end 2410 thereby retaining the shaft 2420 within the handle 2400 in a fixed longitudinal position. The knob 2414 may be loosened, the position of the shaft 2420 adjusted, the knob 2414 tightened, in order to adjust the length of the arm 2030. The internal opening of the threaded end 2410 may be non-circular in shape, such as hexagonal, to provide a matching shape to the exterior of the shaft 2420, such as hexagonal. The non-circular exterior shape of the shaft 2420 and internal opening of the threaded end 2410 inhibits the shaft 2420 from rotation with respect to the handle 2400. While the knob 2414 retains the position of the shaft 2420, there tends to be some wobbliness of the handle 2400 with respect to the shaft 2420. To reduce the wobbliness of the shaft 2420, the handle 2400 may define a plurality (e.g., three) of resilient fingers 2440. The resilient fingers 2440 are in pressing engagement with the exterior of the shaft 2420, at a location offset from the knob 2414, and thereby reduce its wobbliness. The O-rings 2432, 2434 provide a reference point to assist in selecting an appropriate location for an extended arm 2030 and an appropriate location for a retracted arm 2030.

It was determined that over time if the threaded end 2422 is engaged with a matching pair of threads within the base 2020, accessed through the opening 2300, there is a tendency of the threaded end 2422 to become disengaged from the matching pair of threads. This occurs, for example, if the support assembly 2000 is stored in a vibrating environment, such as a vehicle. Inadvertent disengagement may result in the arm 2030 being lost of otherwise not securely engaged with the base 2020.

Figure 31:
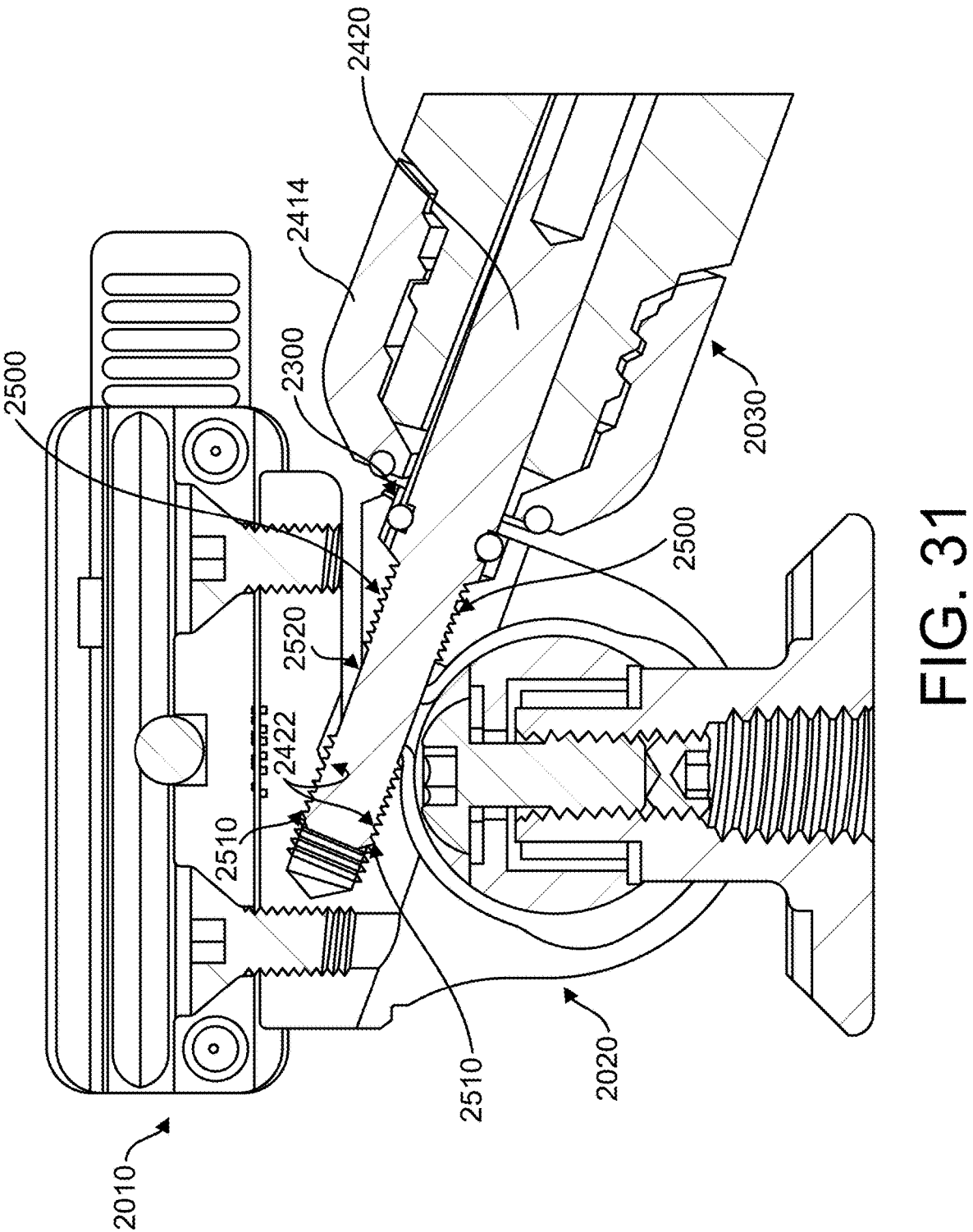
FIG. 31 illustrates a cross section of the support assembly of FIG. 20.

Referring to FIG. 31, a cross sectional view of the support assembly 2000 is illustrated. The end portion of the shaft 2420 is inserted through the opening 2300. The base 2020 may define a first set of threads 2500. The threaded end 2422 of the shaft 2420 is rotatably engaged with the first set of threads 2500. The threaded end 2422 of the shaft 2420 after a sufficient number of rotations passes through the first set of threads 2500. The shaft 2420 may substantially freely move longitudinally with the threaded end 2422 of the shaft 2420 between the first set of threads 2500 and a second set of threads 2510 defined by an opening 2520. The threaded end 2422 of the shaft 2420 is rotatably engaged with the second set of threads 2510. The threaded end 2422 of the shaft 2420 is rotatably engaged with the second set of threads 2510 and secured thereto in a manner that inhibits the freely longitudinal movement of the arm 2030 with respect to the base 2020. Further, the threaded end 2422 of the shaft 2420 is rotatably inhibited from rotation by the second set of threads 2510 with respect to the base 2020. In the event that the threaded end 2422 becomes detached from the second set of threads 2510, such as by an extended exposure to vibrations, the threaded end 2422 is maintained within the opening 2520 between the first set of threads 2500 and the second set of threads 2510. It is highly unlikely that vibration or otherwise non-controlled movement will cause the threaded end 2422 to become aligned with the first set of threads 2500 and become disengaged from the base 2020.

Figure 32:
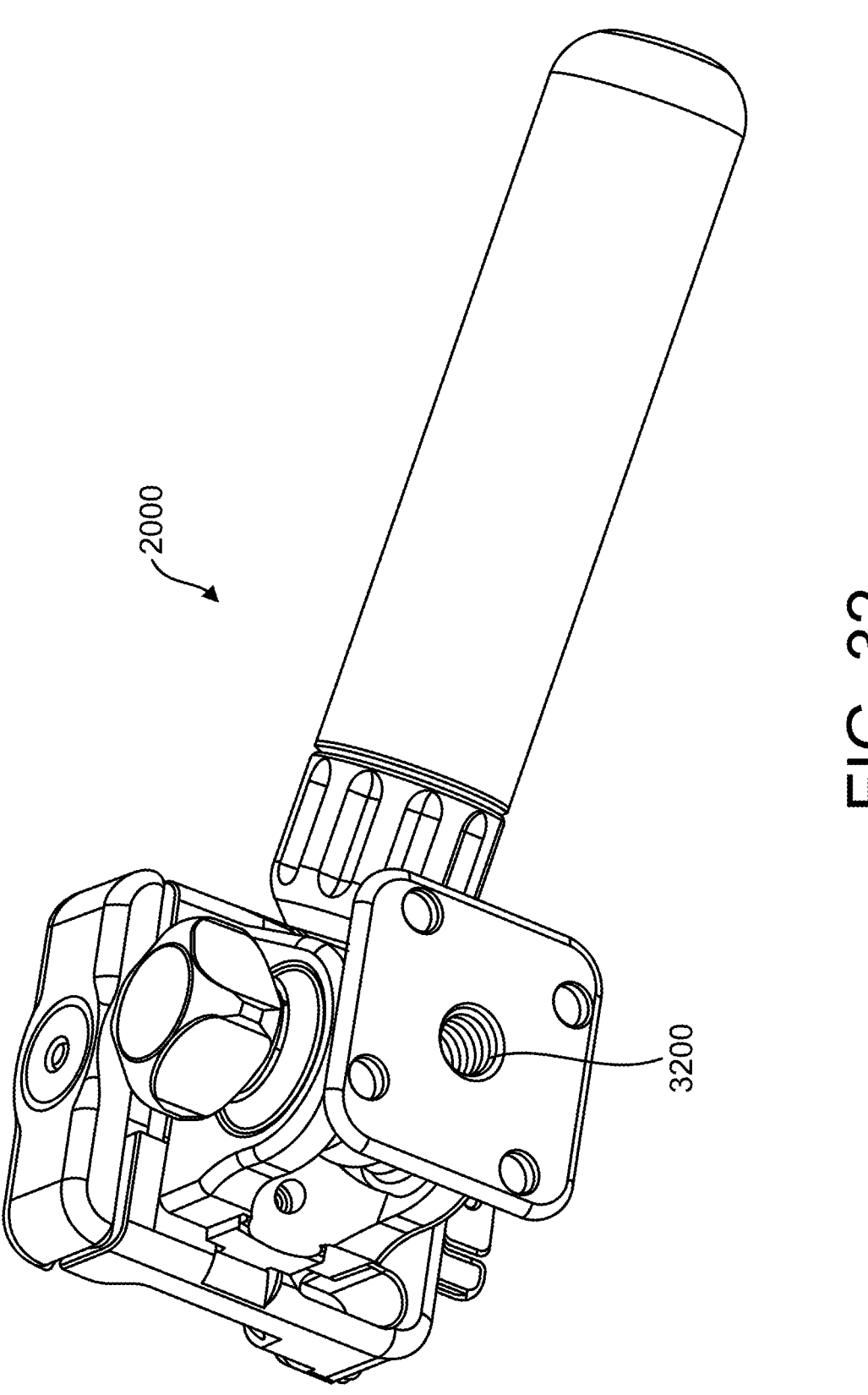
FIG. 32 illustrates a bottom view of the support assembly of FIG. 20.

Referring to FIG. 32, the base 2020 of the support assembly 2000 may include a pair of opposing edges suitable for being engaged with a quick release clamp and/or a threaded opening 3200 defined in the bottom thereof. The threaded opening 3200 is engaged with a screw on a platform of a tripod (not shown) and the support assembly 2000 is rotated until it is secured to the screw and/or platform of the tripod. However, to ensure a secure connection the arm 2010 is typically pulled on to increase the leverage, but the increased leverage has a tendency to cause rotation of the panning mechanism of the tilt-pan head. To increase the amount of torque that may be applied by the arm 2010, the securement mechanism to the panning mechanism is often tightened to reduce the rotation of the panning mechanism when tightening. Unfortunately, often the securement mechanism to the panning mechanism cannot be sufficiently tightened to achieve a sufficiently secure engagement between the tilt-pan head and the screw and/or platform of the tripod.

Figure 33:
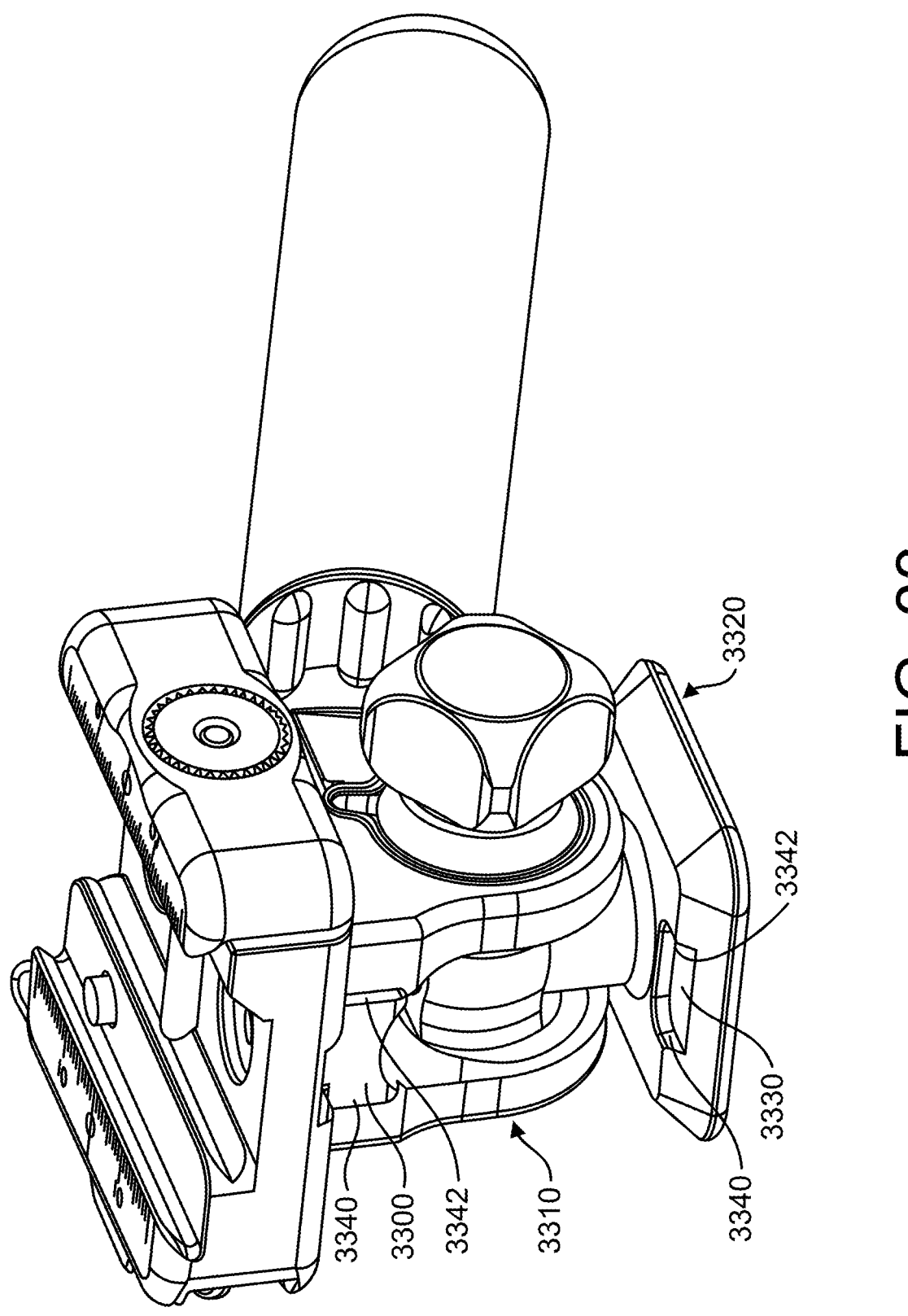
FIG. 33 illustrates the support assembly of FIG. 20.

Referring to FIG. 33, a tilt portion 3310 of the base 2020 may include an outwardly projecting engagement member 3300. A platform 3320 of the base 2200 may include a corresponding mating member 3330. The tilt portion of the base 2020 may be tilted until it comes into engagement with the mating member 3330, with the engagement member 3300 positioned within the recess defined by the mating member 3330. The corresponding adjoining edges 3340, 3342 of the engagement member 3300 and the mating member 3330 are pressed against each other when the support assembly 20000 is rotated to secure it to a screw and/or a platform of a tripod and release it from a screw and/or a platform of a tripod. In this manner, the twisting force is primarily moved from the panning portion of the support assembly 2000 to the adjoining surfaces thereby forming a more rigid structure. In a modified embodiment, the engagement member 3300 may be a recess and the mating member 3330 may be outwardly projecting. In a modified embodiment, the engagement member 3300 and the mating member 3330 may both be outwardly projecting and arranged such that they engage one another, such as in a manner similar to a dovetail.

Figure 34:
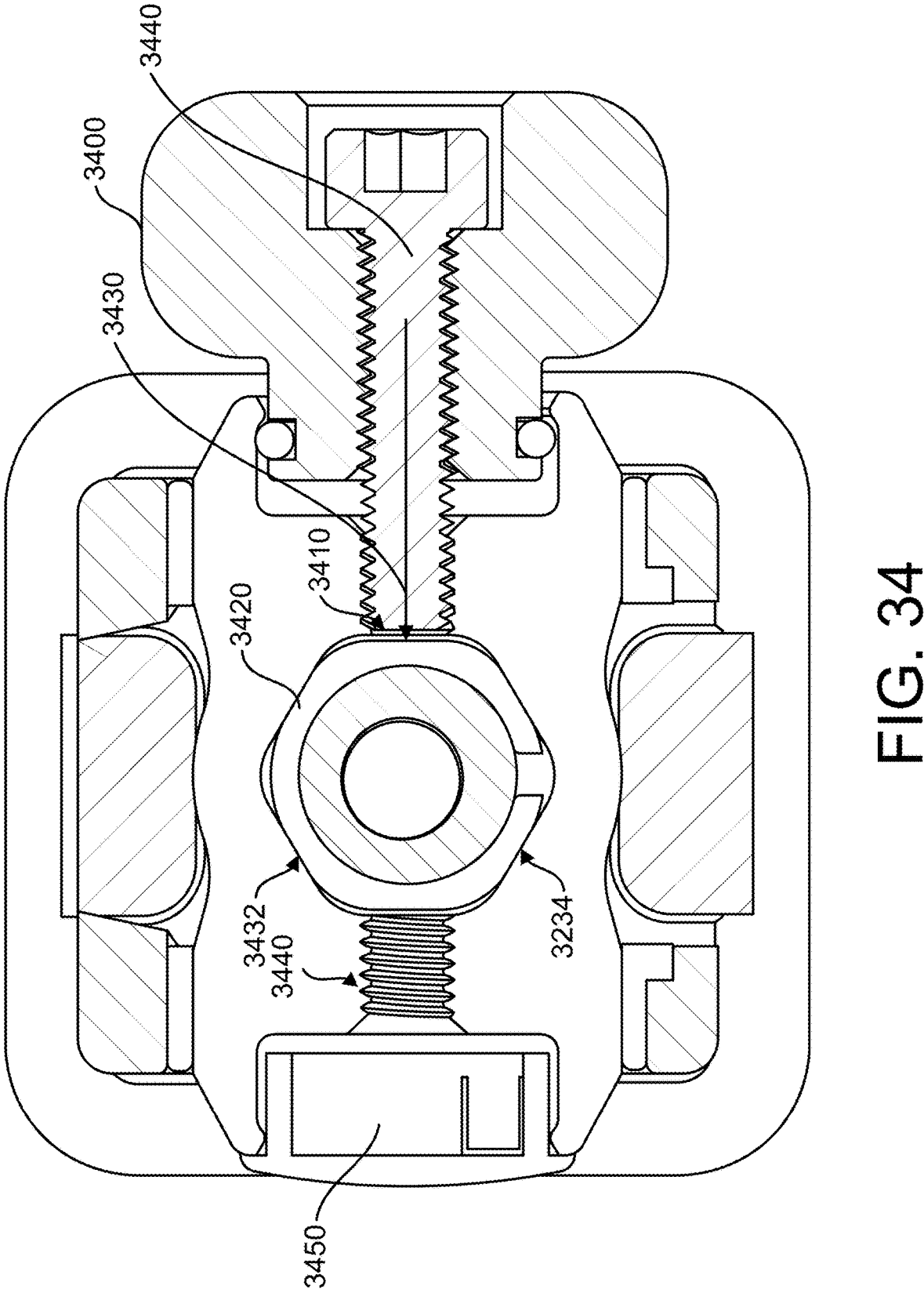
FIG. 34 illustrates a cross section of the support assembly of FIG. 20.

Referring to FIG. 34, the base 2020 may include a panning brake caliper that interfaces with the pan axle to provide a more slop-free action. A knob 3400 is interconnected with a threaded shaft 3410 that is engaged within a threaded opening of the base 2020. The terminal end 3420 of the threaded shaft 3410 presses against a brake caliper 3420 that includes a circular interior surface shaped to match a corresponding pan axle and an exterior surface that is non-circular, and preferably hexagonal in shape. The base 2020 preferably defines a corresponding non-circular opening, and preferably an opening that is hexagonal in shape. As the threaded shaft 3410 is pressed against the brake caliper 3420 the forces are primarily distributed in three directions, namely aligned with the threaded shaft 3410, aligned with a first axis 3432 of the brake caliper 3420, and a second axis 3434 of the brake caliper 3420. With the primary forces aligned along three different axes, the securement structure tends to be relatively stable and secure. Also, due to the symmetric design of the split body caliper, the threaded shaft 3410 can be toollessly and selectively reversed and installed on the other side 3440, thereby providing the user with flexibility to orient the brake knob 3400, as desired. A detachably engageable cap 3450 may be installed on side opposing the brake knob 3400. The brake caliper may also have other shapes, preferably shapes that are symmetrical, such as eight, ten, or twelve exterior sides.

The resistance to movement of the tilt motion is controlled through the action of tightening of the threaded handle. The main body comprises of a split member where at least one portion of the split member has a threaded hole to receive a threaded stud, and a circular shape that receives an axle. The threaded handle (or knob) includes a flanged surface that can be flat, conical, or spherical in form that interfaces with the split member opposite the split member with the threaded hole. The interface may also include a washer or intermediary structure to act as a bearing to reduce wear or friction between the flange of the threaded handle and the split member. Tightening the threaded handle creates a pinching force across the split member which increases the tension on the axle. Loosening the threaded handle reduce the pinching force across the split member which decreases the tension on the axle. The split member may contact the axle directly or there may be an intermediate structure, such as a plastic sleeve, that acts as a wear surface.

Figure 35:
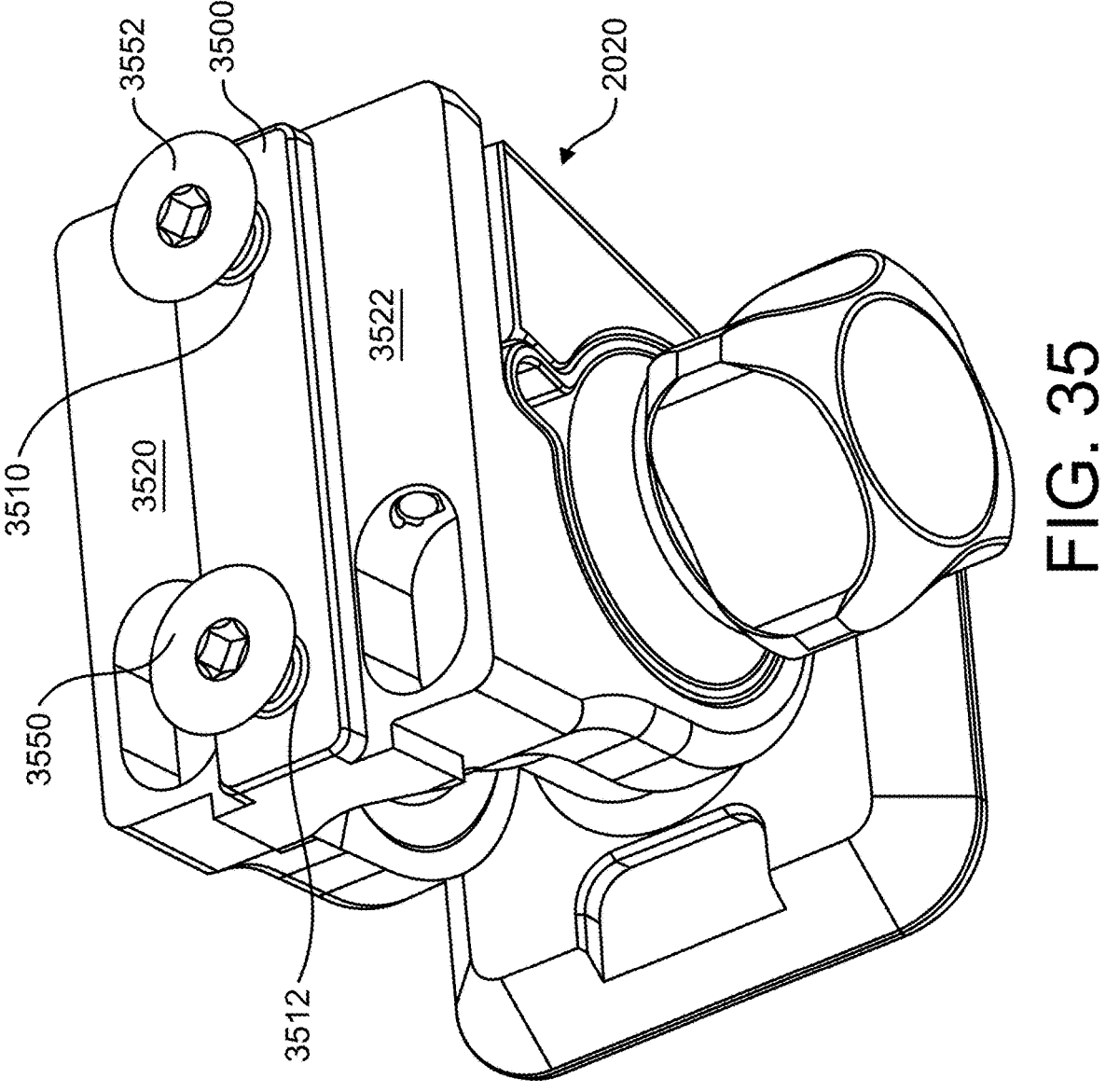
FIG. 35 illustrates a view of the base of FIG. 20.
Figure 36:
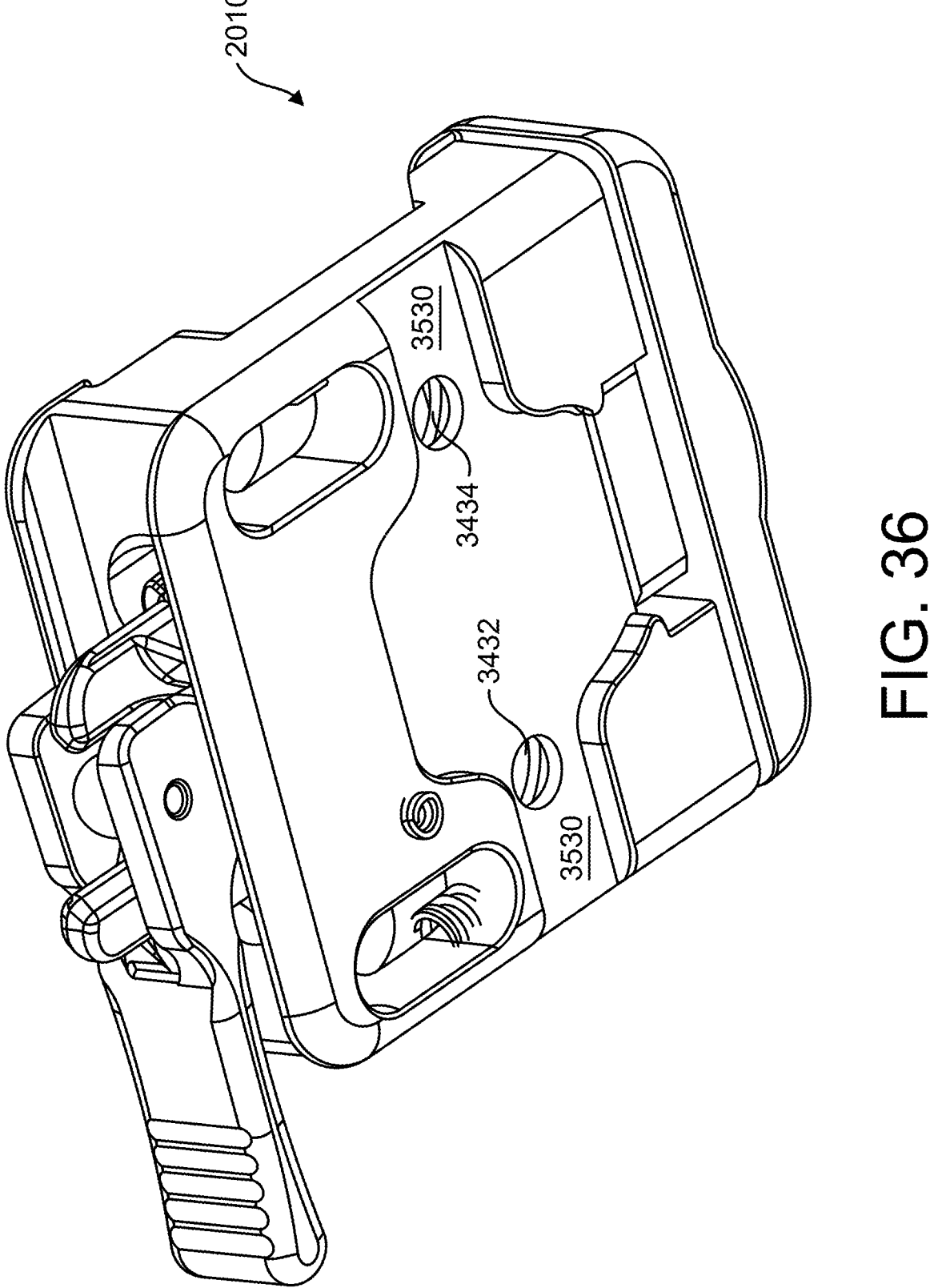
FIG. 36 illustrates a view of the clamp of FIG. 20.
Figure 37:
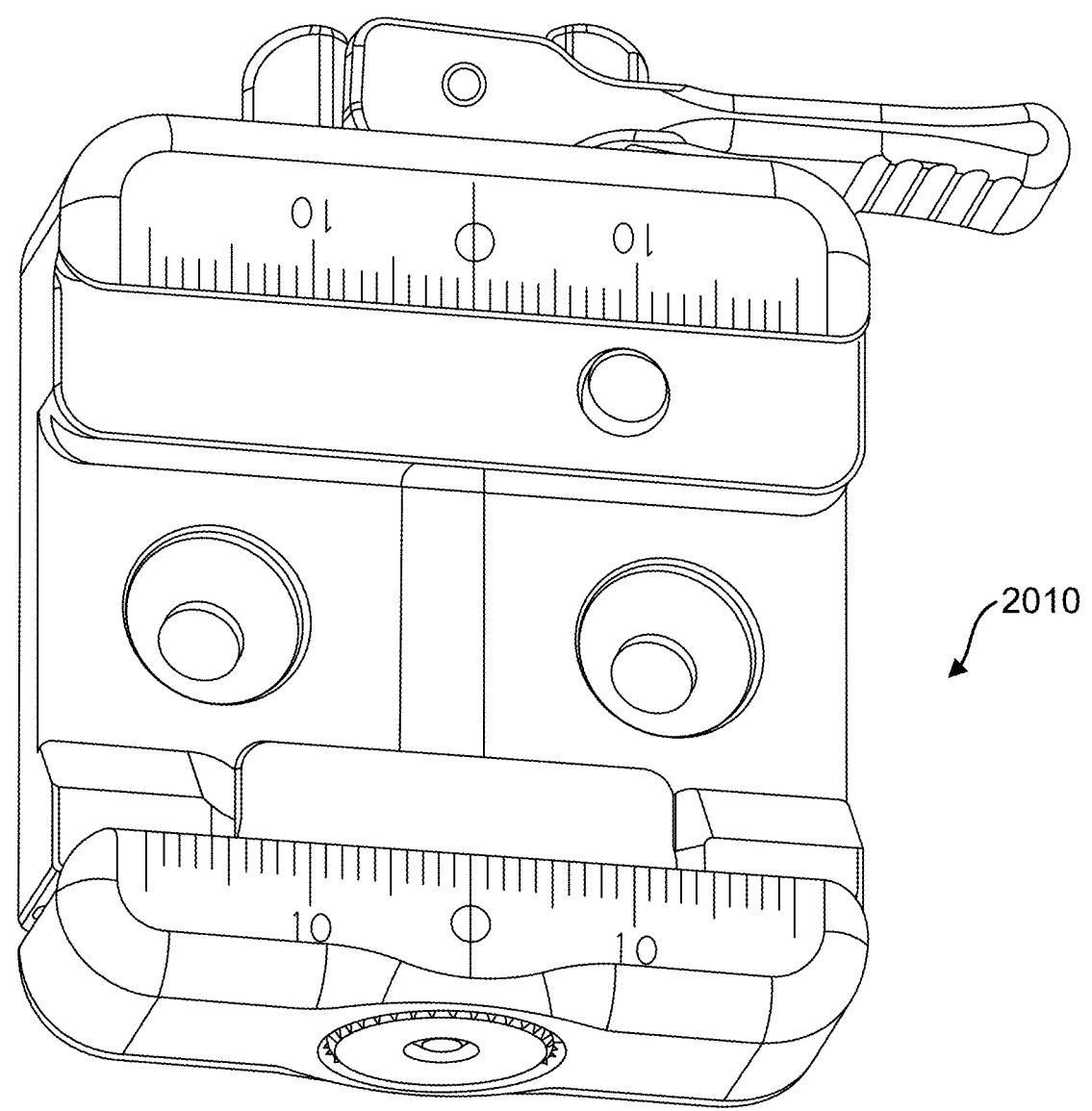
FIG. 37 illustrates a view of the clamp of FIG. 20.

Referring to FIG. 35, FIG. 36, and FIG. 37, the base 2020 and the clamp 2010 preferably include a detachable interconnection. The base 2020 preferably defines a raised elongate portion 3500 together with a pair of threaded openings 3510, 3512. The base 2020 also preferably defines a pair of planar regions 3520, 3522 on either side of the raise elongate portion 3500. The clamp 2010 preferably defines a recessed elongate portion 3530 together with a pair of openings 3432, 3434. The size of the raise elongate portion 3500 is sized to engage with the recessed elongate portion 3530 so that the exterior surfaces are in a face-to-face arrangement. When the raise elongate portion 3500 and the recessed elongate portion 3530 are aligned with one another, the openings 3432, 3434 of the clamp 2010 and the openings 3510, 3512 of the base 2020 are aligned with one another. A pair of screws 3550, 3552 are secured through the pairs of openings to detachably secure the clamp 2010 to the base 2020. The screws 3550, 3552 may be removed, the clamp 2010 replaced with a different clamp or other structure, which is then engaged using the screws 3550, 3552.

Figure 38:
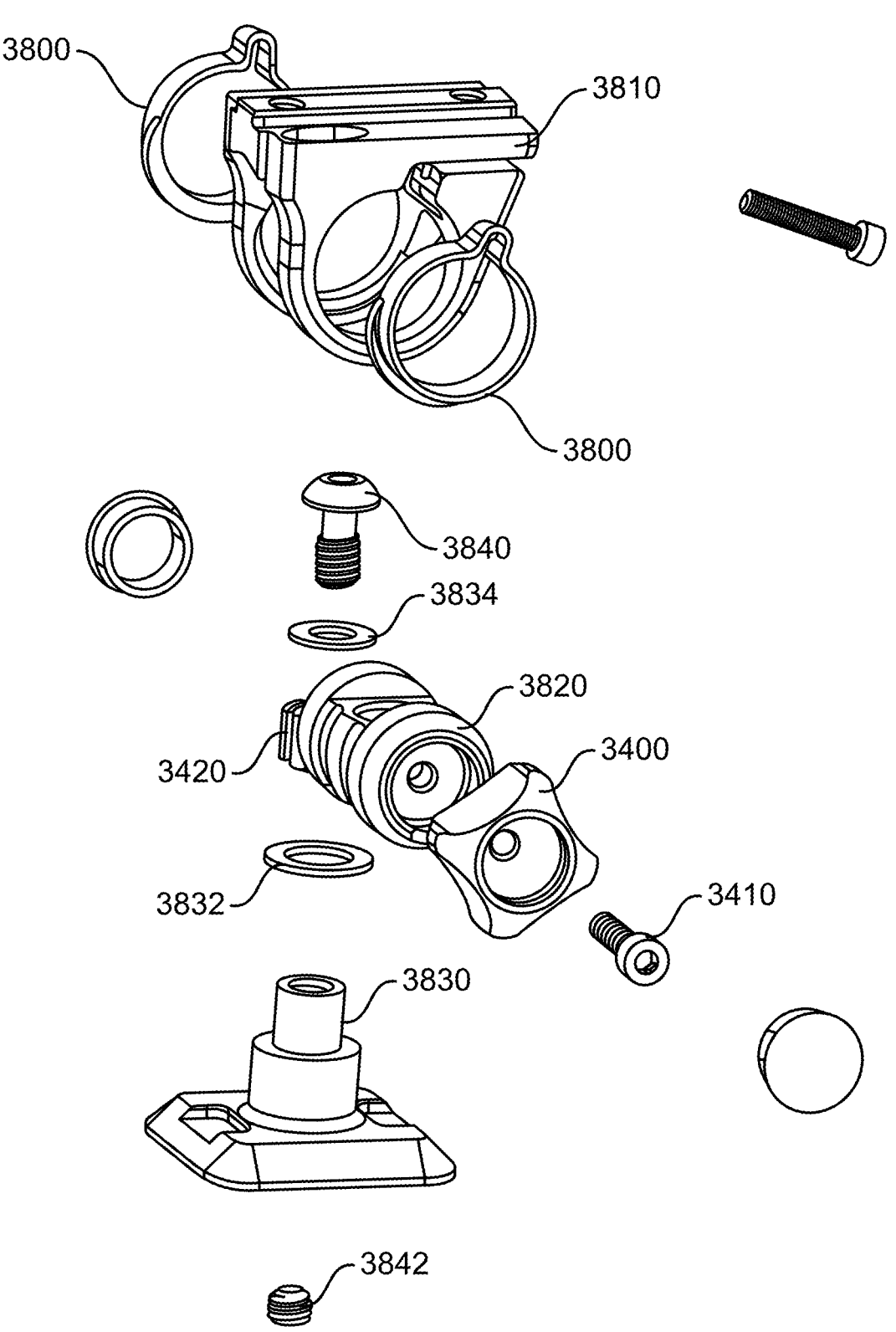
FIG. 38 illustrates and exploded view of the base of FIG. 20.
Figure 39:
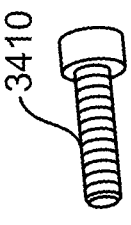
FIG. 39 illustrates a portion of the exploded view of FIG. 38.
Figure 40:
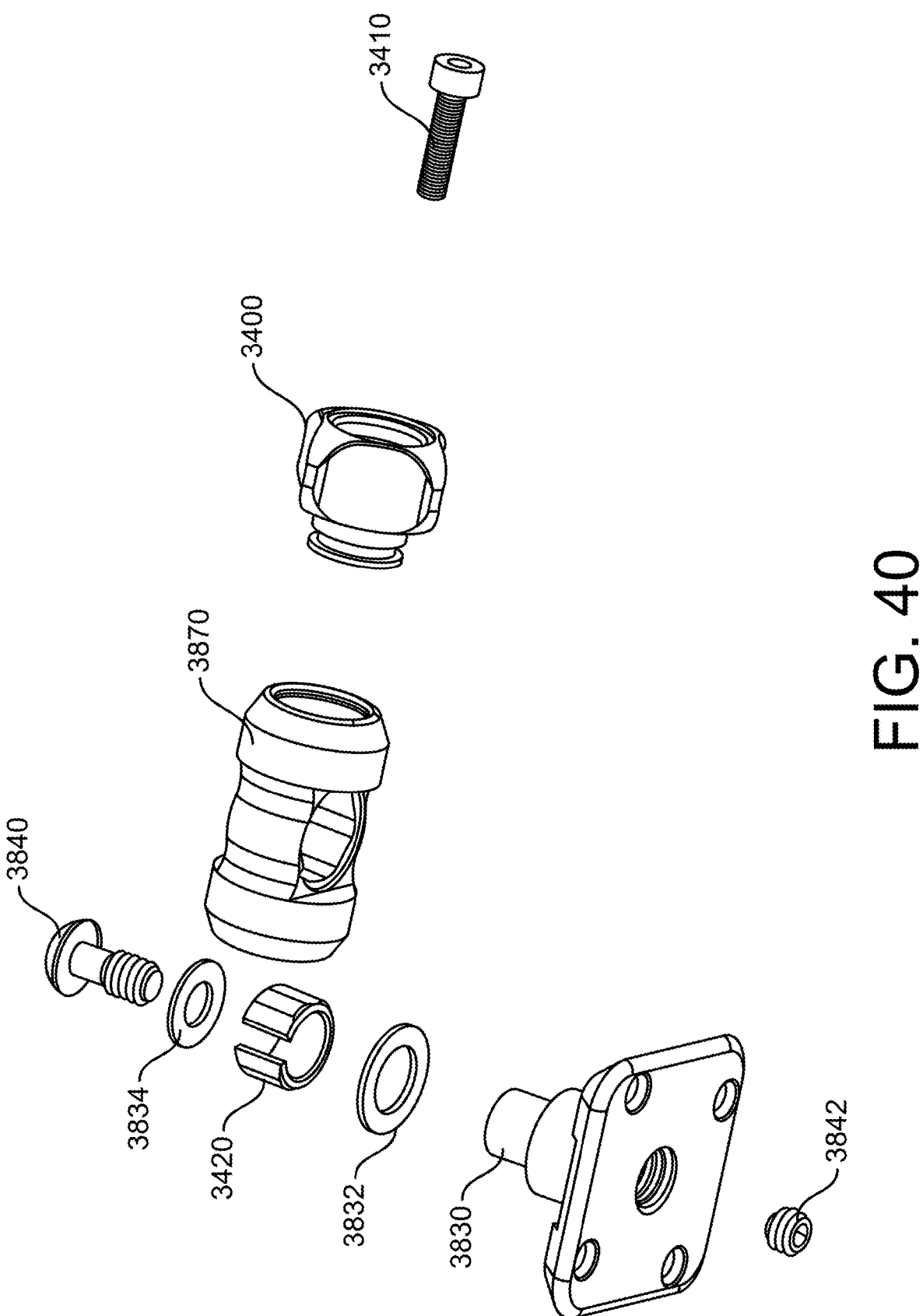
FIG. 40 illustrates a portion of the exploded view of FIG. 38.

Referring to FIG. 38, a portion of the base 2020 includes the knob 3400, the threaded shaft 3410 that are engaged with a main axle 3820. A pair of sleeves 3800 are inserted from the inside of a main flexure body 3810. The flanges on each of the pair of sleeves 3800 prevent them from pushing out and also are "snapped" into a grove at the split of the main flexure body 3810. The main axle 3820 is inserted into the sleeves 3800, and accordingly the main flexure body 3810. Referring also to FIG. 39 and FIG. 40, a panning shaft 3830 may include a washer 3832 inserted thereon followed by the split hexagonal brake caliper 3420. The panning shaft subassembly with the washer 3832 and brake caliper 3420 are inserted up into the main axle 3820. A washer 3834 may be installed on the top side of the main axle 3820, opposite to where the brake caliper 3420 was inserted. The main body may be tilted backwards to provide sufficient clearance for a pan timing screw 3840 to be inserted from above and timed to a suitable tightness. A set screw 3842 that screws into the base may be used to lock the pan timing screw 3840 in place. The main body may be tiled upwards to allow the threaded handle (arm 2030) to be installed.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A support for a device comprising:
   (a) a clamp with a movable member suitable to detachably secure said device thereon;
   (b) a base supporting said clamp, wherein said base provides at least a panning rotation for said clamp and a tilting rotation for said clamp;
   (c) an elongate arm detachably engageable with said base;
   (d) said elongate arm including a shaft together with a threaded end portion;
   (e) said base including a first threaded portion and a second threaded portion aligned with one another and offset from one another with a non-threaded portion;
   (f) said threaded end portion of said shaft engageable with said first threaded portion in a manner such that said threaded end portion passes through said first threaded end portion, and said threaded end portion of said shaft engageable with said second threaded portion while said shaft passes through said first threaded portion and said non-threaded portion.

2. The support for said device of claim 1 further comprising said elongate arm including a handle with a cylindrical shape.

3. The support for said device of claim 2 further comprising said handle including a threaded end portion.

4. The support for said device of claim 3 wherein said threaded end portion includes at least one slit defined therein.

5. The support for said device of claim 4 further comprising a knob that defines knob threads that engage with said threaded end portion of said handle in a manner that narrows said at least one slit.

6. The support for said device of claim 5 wherein said shaft defines a recess and an O-ring is engaged with said recess that extends proud of at least a portion of said shaft.

7. The support for said device of claim 1 further comprising said elongate arm including a handle with a threaded end portion and a plurality of resilient fingers that are in pressing engagement with said shaft.

8. A support for a device comprising:

(a) a clamp with a movable member suitable to detachably secure said device thereon;

(b) a base supporting said clamp, wherein said base provides at least a panning rotation for said clamp and a tilting rotation for said clamp;

(c) an elongate arm detachably engageable with said base;

(d) said elongate arm including a shaft together with a threaded end portion that defines at least one slit;

(e) a knob that defines knob threads that engage with said threaded end portion of said handle in a manner that narrows said at least one slit when engaged therewith.

9. The support of claim 8 further comprising said base including a first threaded portion and a second threaded portion aligned with one another and offset from one another with a non-threaded portion, and said threaded end portion of said shaft engageable with said first threaded portion in a manner such that said threaded end portion passes through said first threaded end portion, and said threaded end portion of said shaft engageable with said second threaded portion while said shaft passes through said first threaded portion and said non-threaded portion.

10. The support of claim 8 further comprising said elongate arm defining a plurality of fingers that are in pressing engagement with said shaft.

11. A support for a device comprising:

(a) a clamp with a movable member suitable to detachably secure said device thereon;

(b) a base supporting said clamp, wherein said base provides a panning rotation for said clamp and a tilting rotation for said clamp that are separate from one another;

(c) an elongate arm detachably engageable with said base;

(d) said base including a panning axle and a brake caliper;

(e) said base including a threaded member that selectively presses against said brake caliper to selectively inhibit said panning rotation;

(f) said brake caliper includes a non-circular external cross section, wherein said brake caliper has at least three exterior straight sides;

(g) said base defines an opening to receive said brake caliper, said opening having respective straight surfaces opposing said at least three exterior straight sides of said caliper;

(h) said threaded member being capable of engaging one of said straight sides of said brake caliper when said threaded member selectively presses against said brake caliper, and said threaded member defining an engagement axis perpendicular to said one of said straight sides when said threaded member selectively presses against said brake caliper; and (i) when said threaded member selectively presses against said brake caliper at least two of said exterior sides of said brake caliper engage said straight surfaces of said opening with primary forces aligned along axes that are different than said engagement axis of said threaded member.

12. The support of claim 11 wherein said brake caliper includes a circular internal cross section that is in face-to-face alignment with said panning axle.

13. The support of claim 12 wherein said brake caliper has a hexagonal exterior surface.

14. The support of claim 11 wherein said brake caliper has a hexagonal exterior surface.

15. The support of claim 11 wherein said brake caliper has an exterior surface comprising eight surfaces.

16. The support of claim 11 wherein said brake caliper is symmetrical.

* * * * *